(12) United States Patent
Kim et al.

(10) Patent No.: US 12,418,772 B2
(45) Date of Patent: Sep. 16, 2025

(54) METHOD AND APPARATUS FOR DETECTING TERMINAL THAT DEVIATES FROM CLUSTER

(71) Applicant: LG ELECTRONICS INC., Seoul (KR)

(72) Inventors: Myoungseob Kim, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 417 days.

(21) Appl. No.: 17/913,137

(22) PCT Filed: Mar. 20, 2020

(86) PCT No.: PCT/KR2020/003890
§ 371 (c)(1),
(2) Date: Sep. 20, 2022

(87) PCT Pub. No.: WO2021/187648
PCT Pub. Date: Sep. 23, 2021

(65) Prior Publication Data
US 2023/0141017 A1 May 11, 2023

(51) Int. Cl.
*H04W 4/02* (2018.01)
*H04W 4/08* (2009.01)
*H04W 4/40* (2018.01)

(52) U.S. Cl.
CPC ............ *H04W 4/027* (2013.01); *H04W 4/08* (2013.01); *H04W 4/40* (2018.02)

(58) Field of Classification Search
CPC ... H04W 4/027; H04W 4/029; H04W 12/069; H04W 72/0453; H04W 74/04; H04W 4/80; H04W 28/22; H04W 8/005
(Continued)

(56) References Cited

U.S. PATENT DOCUMENTS 8,620,549 B2 * 12/2013 Nickolaou ............. B60Q 9/008
701/70
10,080,124 B2 * 9/2018 Tan ........................ H04W 4/80
(Continued)

FOREIGN PATENT DOCUMENTS

CN 102398554 B * 3/2015 ............. B60Q 9/008
KR 1020180042034 4/2018
(Continued)

OTHER PUBLICATIONS

Korean Intellectual Property Office Application No. 10-2022-7031275, Notice of Allowance dated Aug. 26, 2024, 2 pages.
(Continued)

*Primary Examiner* — William D Cumming
(74) *Attorney, Agent, or Firm* — LEE, HONG, DEGERMAN, KANG & WAIMEY

(57) ABSTRACT

According to at least one embodiment, a method and apparatus for detecting a vulnerable road user or a terminal of the vulnerable road user that deviates from a cluster are disclosed. A base station detects the deviation of a second terminal from the cluster on the basis of a safety message received from a first terminal, and transmits a warning message to at least one of a peripheral terminal and a traffic control center. The first terminal and the second terminal are included in the same cluster, the safety message includes at least one of cluster information associated with the mobility of the cluster and user information associated with the mobility of the first terminal, and the warning message includes deviation information association with the second terminal.

17 Claims, 37 Drawing Sheets

(58) Field of Classification Search
USPC .......................... 455/404.2, 456.3; 370/315
See application file for complete search history.

(56) References Cited

U.S. PATENT DOCUMENTS

| | | | | |
|---|---|---|---|---|
| 10,271,269 | B2* | 4/2019 | Van Phan | ......... H04W 72/0453 |
| 11,228,880 | B2* | 1/2022 | Aldana | ................ H04W 8/005 |
| 2009/0245159 | A1* | 10/2009 | Oyman | ................ H04L 45/122 |
| | | | | 370/315 |
| 2012/0065858 | A1* | 3/2012 | Nickolaou | ............. B60Q 9/008 |
| | | | | 701/1 |
| 2016/0242101 | A1* | 8/2016 | Van Phan | ............. H04W 74/04 |
| 2016/0381538 | A1* | 12/2016 | Tan | ....................... H04W 4/027 |
| | | | | 455/404.2 |
| 2018/0096605 | A1* | 4/2018 | Bai | ........................ B60Q 1/525 |
| 2019/0351896 | A1 | 11/2019 | Solmaz et al. | |
| 2019/0385448 | A1 | 12/2019 | Montemurro et al. | |
| 2020/0120458 | A1* | 4/2020 | Aldana | ................. H04W 28/22 |
| 2023/0141017 | A1* | 5/2023 | Kim | ...................... H04W 4/029 |
| | | | | 455/456.3 |

FOREIGN PATENT DOCUMENTS

| | | |
|---|---|---|
| KR | 20180049709 | 5/2018 |
| KR | 20200015506 | 2/2020 |
| KR | 1020200017388 | 2/2020 |
| WO | WO-2021187648 A1 * | 9/2021 ............... G08G 1/07 |

OTHER PUBLICATIONS

Intelligent Transport System (ITS)': Vulnerable Road Users (VRU) awareness; Part 1: Use Cases definition; Release 2', ETSI TR 103 300-1 V2.1.1, Sep. 2019, 76 pages.

PCT International Application No. PCT/KR2020/003890, International Search Report dated Dec. 3, 2020, 5 pages.

* cited by examiner

FIG. 9
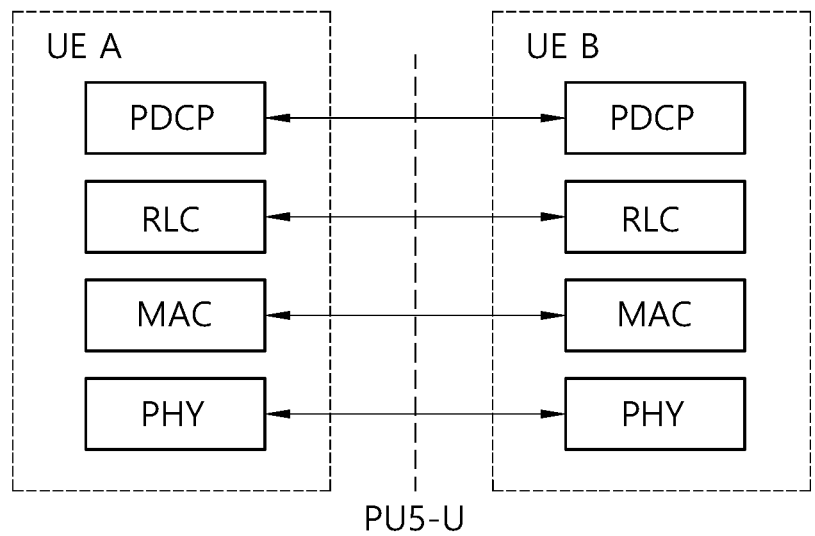
(a)
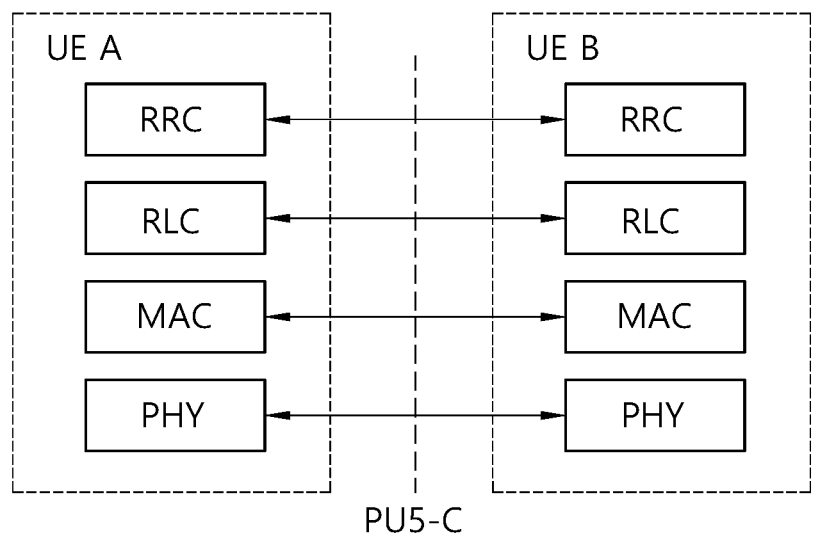
(b)

FIG. 10
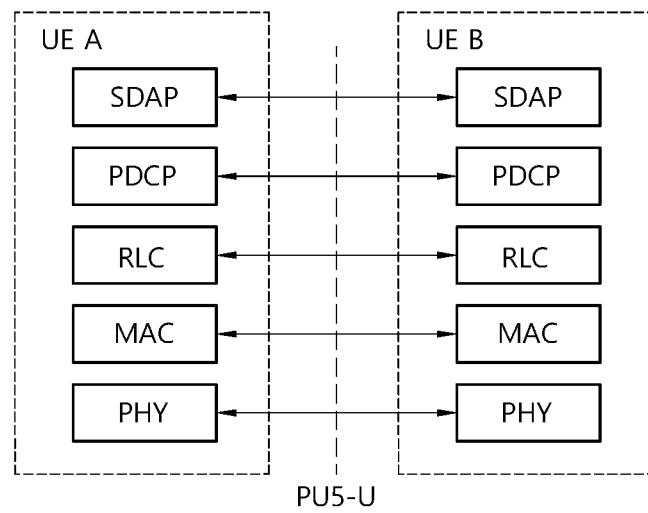
(a)
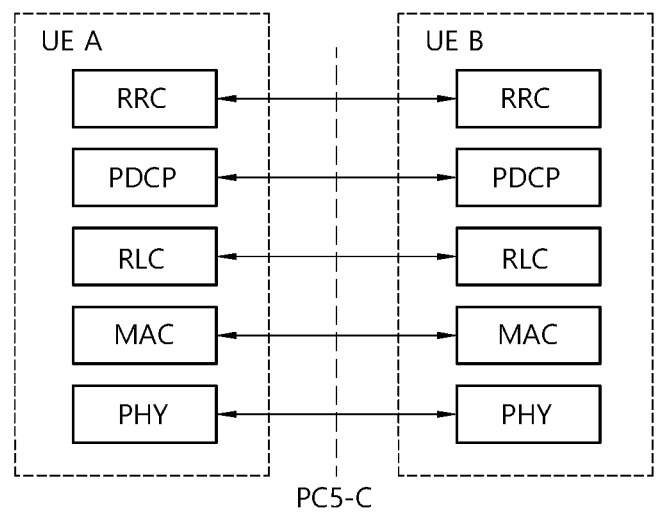
(b)

FIG. 24

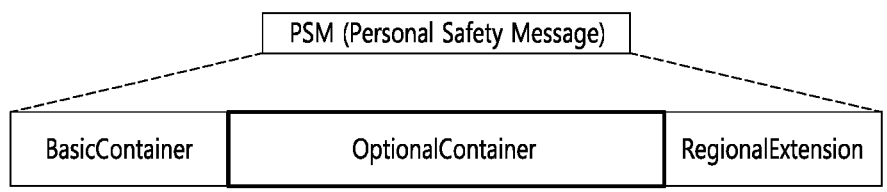

| ASN.1 Representation | | |
|---|---|---|
| DF_personalSafetymessage | ::= SEQUENCE { | |
| accelSet | AccelerationSet4Way | OPTIONAL, |
| pathHistory | PathHistory | OPTIONAL, |
| pathPrediction | PathPrediction | OPTIONAL, |
| propulsion | PropelledInformation | OPTIONAL, |
| useState | PersonalDeviceUsageState | OPTIONAL, |
| crossRequest | PersonalCrossingRequest | OPTIONAL, |
| crossState | PersonalCrossingInProgress | OPTIONAL, |
| clusterSize | NumberOfParticipantsInCluster | OPTIONAL, |
| clusterRadius | PersonalClusterRadius | OPTIONAL, |
| eventResponderType | PublicSafetyEventResponderWorkerType | OPTIONAL, |
| activityType | PublicSafetyAndRoadWorkerActivity | OPTIONAL, |
| activitySubType | PublicSafetyDirectingTrafficSubType | OPTIONAL, |
| assistType | PersonalAssistive | OPTIONAL, |
| sizing | UserSizeAndBehaviour | OPTIONAL, |
| attachment | Attachment | OPTIONAL, |
| attachmentRadius | AttachmentRadius | OPTIONAL, |
| animalType | AnimalType | OPTIONAL, |
| clusterId | ClusterID | OPTIONAL, |
| clusterLeaving | ClusterLeaving | OPTIONAL, |
| } | | |

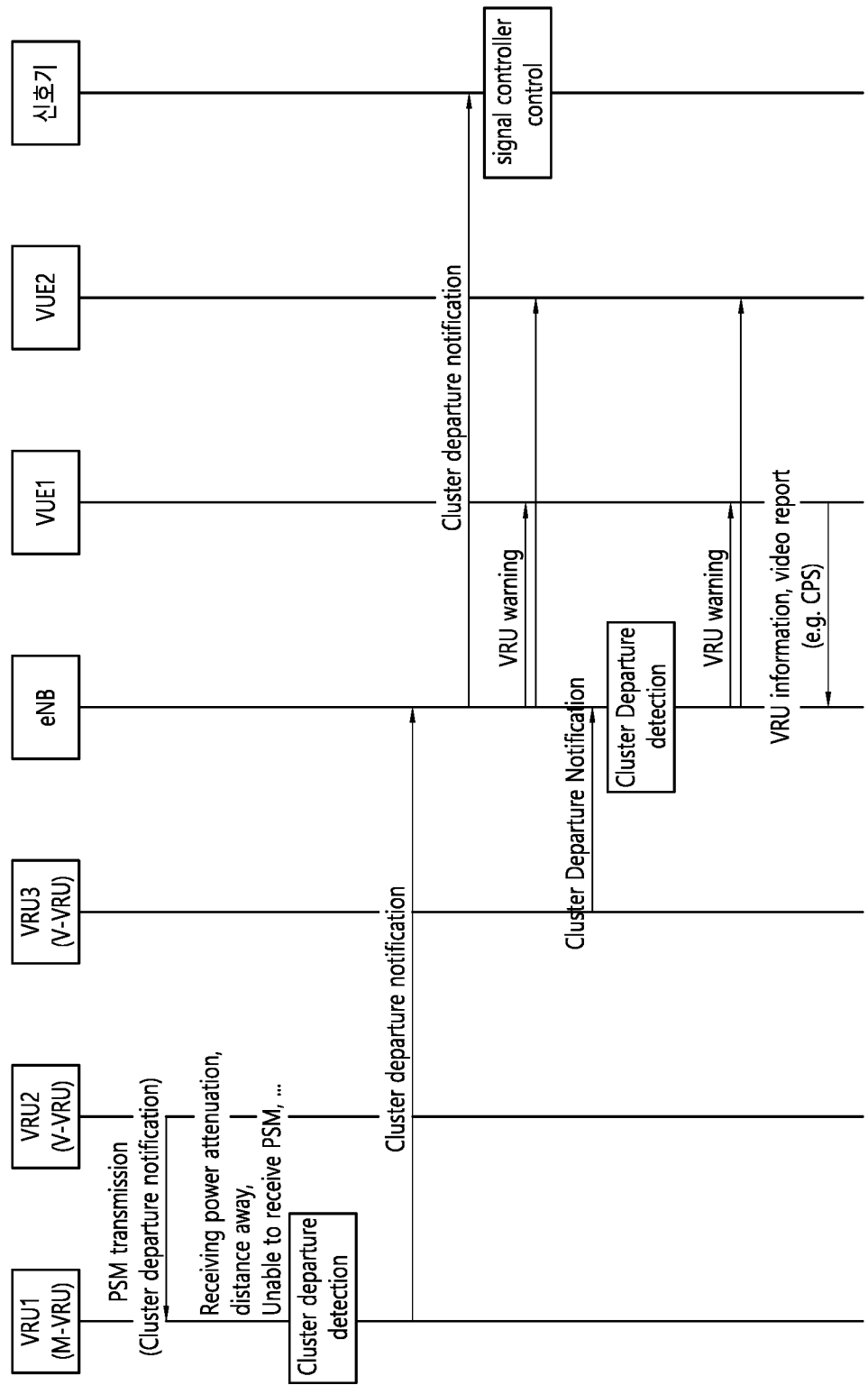

METHOD AND APPARATUS FOR DETECTING TERMINAL THAT DEVIATES FROM CLUSTER

CROSS-REFERENCE TO RELATED APPLICATIONS

This application is the National Stage filing under 35 U.S.C. 371 of International Application No. PCT/KR2020/003890, filed on Mar. 20, 2020, the contents of which are all incorporated by reference herein in their entirety.

BACKGROUND OF THE DISCLOSURE

Field of the Disclosure

The present disclosure relates to wireless communication.

Related Art

V2X means communication between a terminal installed in a vehicle and other terminals, and the other terminals may be a pedestrian, a vehicle, and an infrastructure, and in this case, the other terminals may be sequentially called vehicle to pedestrian (V2P), vehicle to vehicle (V2V), vehicle to infrastructure (V2I), etc.

In V2X communication, data/control information may be transmitted and received through a sidelink defined in a D2D operation other than an uplink/downlink between a base station and the terminal used in conventional LTE communication.

SUMMARY

The present disclosure proposes a method for actively protecting vulnerable road users through communication between devices or through an infrastructure/network communication method that is less sensitive to power consumption than a general device and has excellent computational processing capability when vulnerable road users form a cluster and move.

According to the present disclosure, it is possible to more effectively protect vulnerable road users, particularly vulnerable road users who have left the cluster.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

BRIEF DESCRIPTION OF THE DRAWINGS

FIG. 9 shows a radio protocol architecture for a SL communication, in accordance with an embodiment of the present disclosure.

FIG. 10 shows a radio protocol architecture for a SL communication, in accordance with an embodiment of the present disclosure.

FIG. 24 schematically illustrates another example of a configuration of a PSM message according to some implementations of the present disclosure.

FIG. 25 is a flowchart of an example of a method for detecting an out-of-cluster VRU according to some implementations of the present disclosure.

DESCRIPTION OF EXEMPLARY EMBODIMENTS

Figure 1:
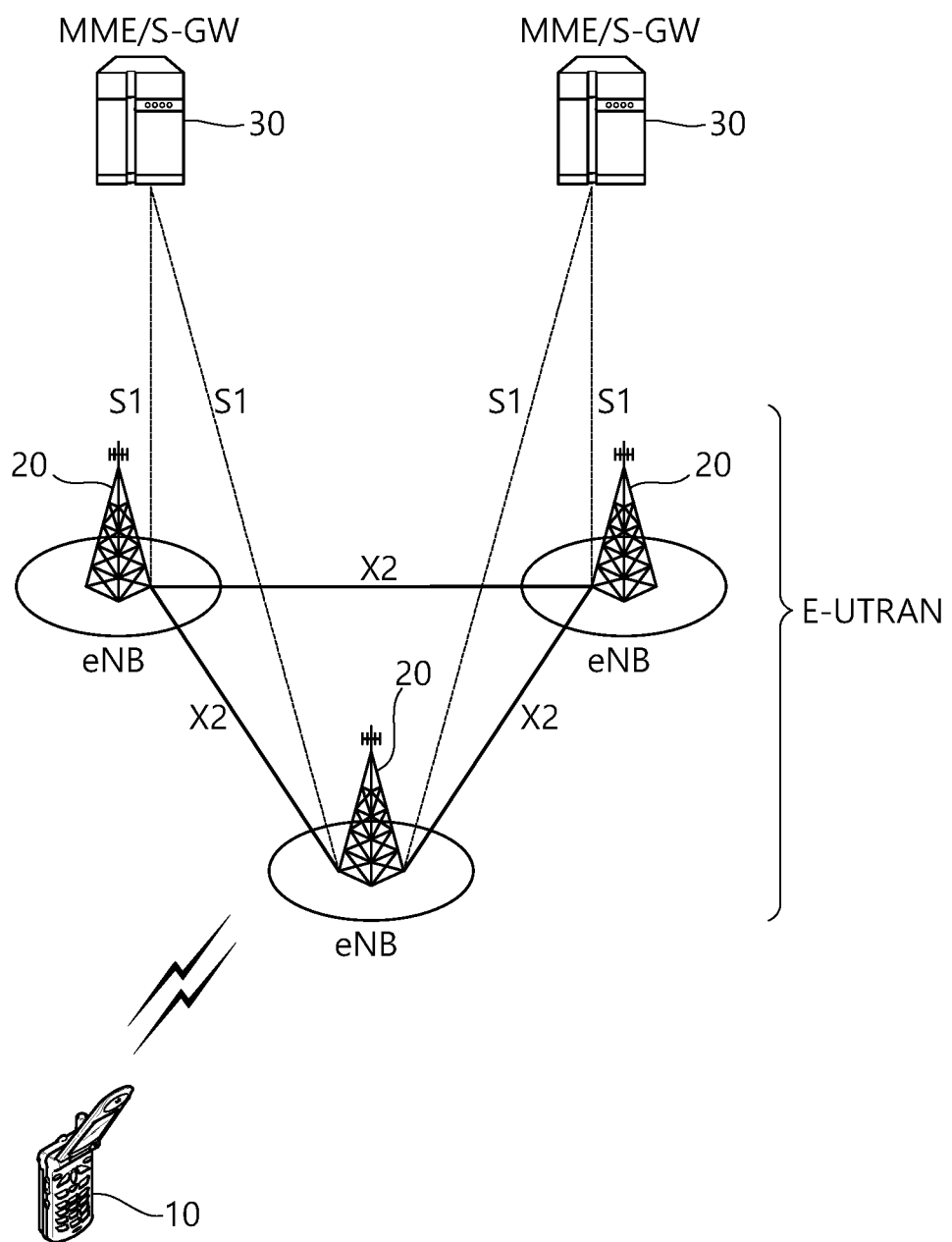
FIG. 1 shows a structure of an LTE system, in accordance with an embodiment of the present disclosure.

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

The following technology may be used for various wireless communication systems which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. IEEE 802.16m as an evolution of IEEE 802.16e provides backward compatibility with a system based on IEEE 802.16e. The UTRA is part of Universal Mobile Telecommunications System (UMTS). 3rd Generation Partnership Project (3GPP) Long Term Evolution (LTE) as a part of Evolved UMTS (E-UMTS) using the E-UTRA (evolved-UMTS terrestrial radio access) adopts OFDMA in downlink and adopts SC-FDMA in uplink. LTE-Advanced (A) is evolution of LTE.

5G NR as subsequent technology is a new clean-slate type mobile communication system having features such as high performance, low latency, high availability, etc. 5G NR may utilize all available spectrum resources such as intermediate frequency band of 1 GHz to 10 GHz, a high-frequency (millimeter wave) band of 24 GHz or more, etc., from a low-frequency band less than 1 GHz.

For clear description, LTE-A or 5G NR is primarily described, but a technical spirit of the present disclosure is not limited thereto. The LTE-A or 5G NR may be referred to as an evolved-UMTS terrestrial radio access network (E-UTRAN) or long term evolution (LTE)/LTE-A system.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicated with the UE 10 and may also be referred to by using different terms, such as evolved-NodeB (eNB), Base Transceiver System (BTS), Access Point (AP), and so on.

The base stations 20 are interconnected to one another through an 23 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
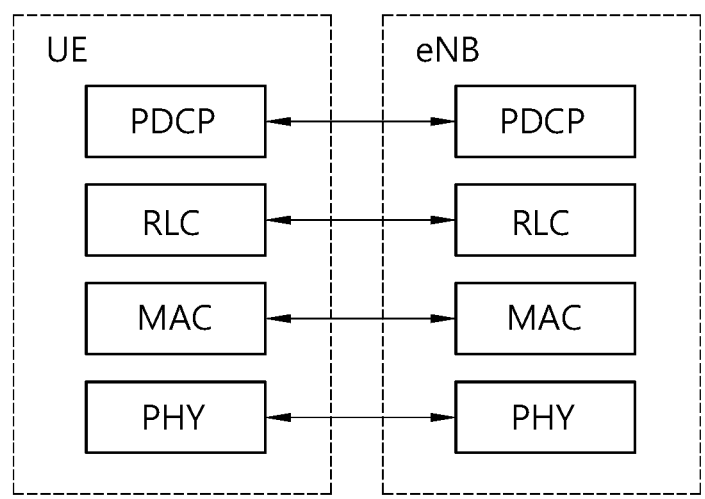
FIG. 2 shows a radio protocol architecture of a user plane, in accordance with an embodiment of the present disclosure.
Figure 3:
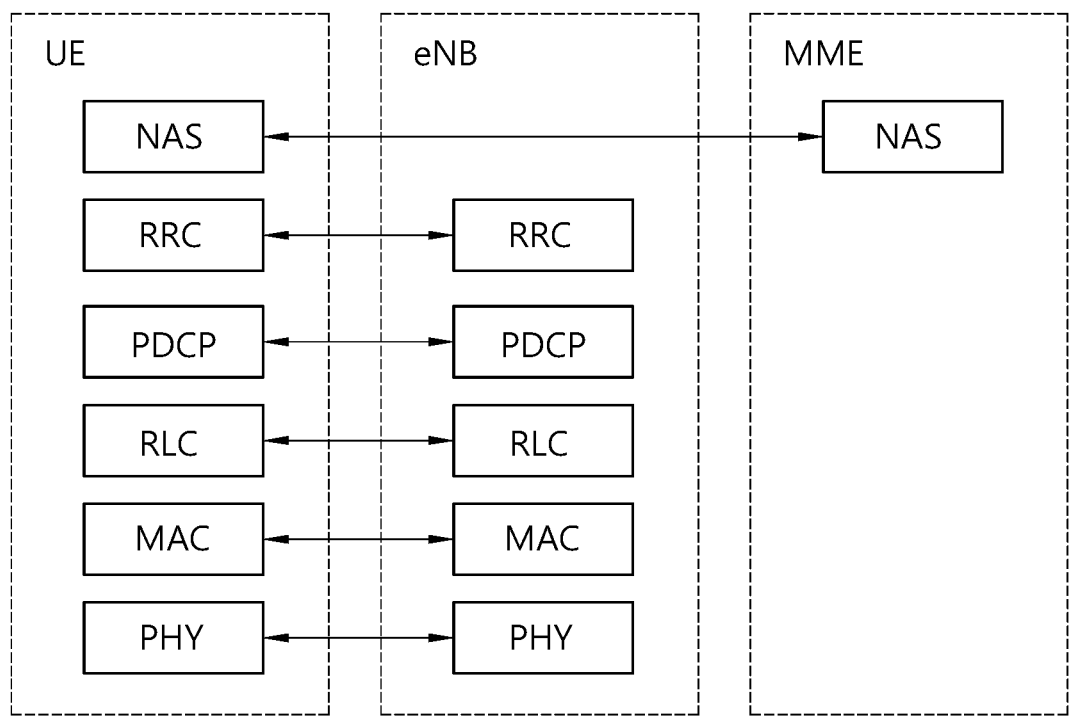
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
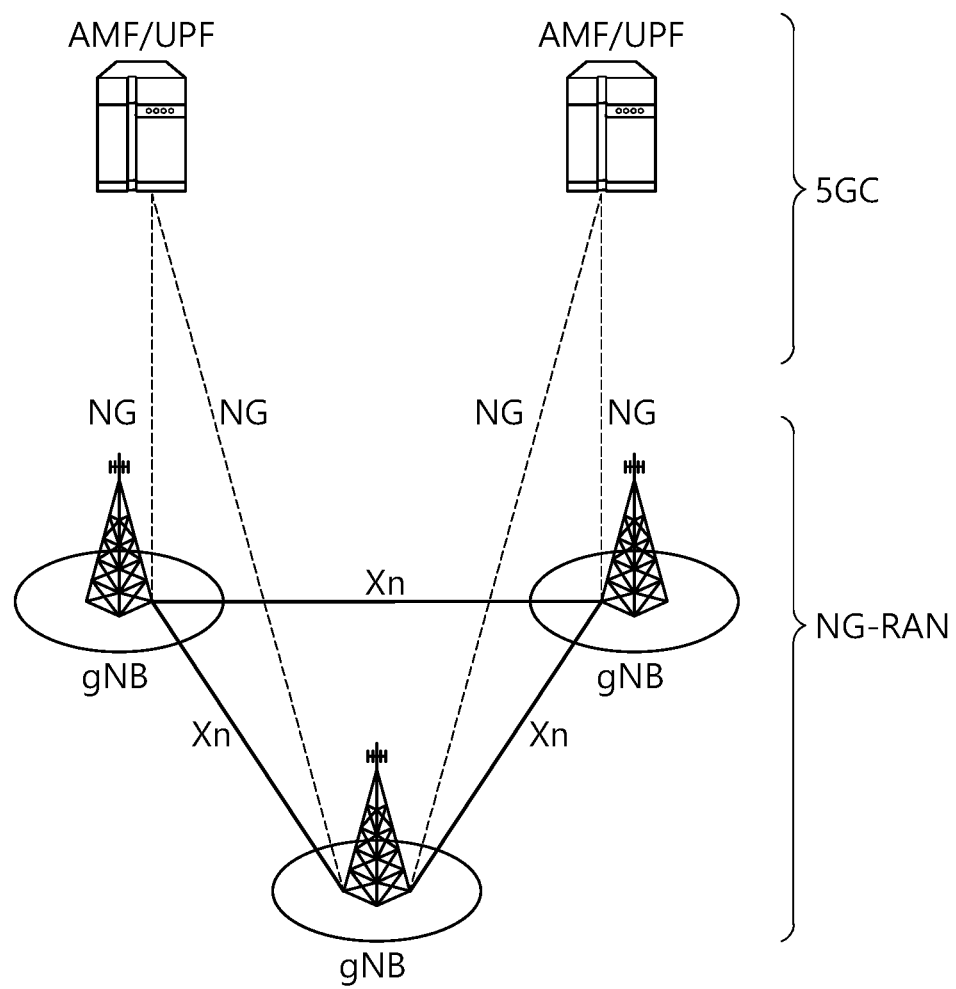
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
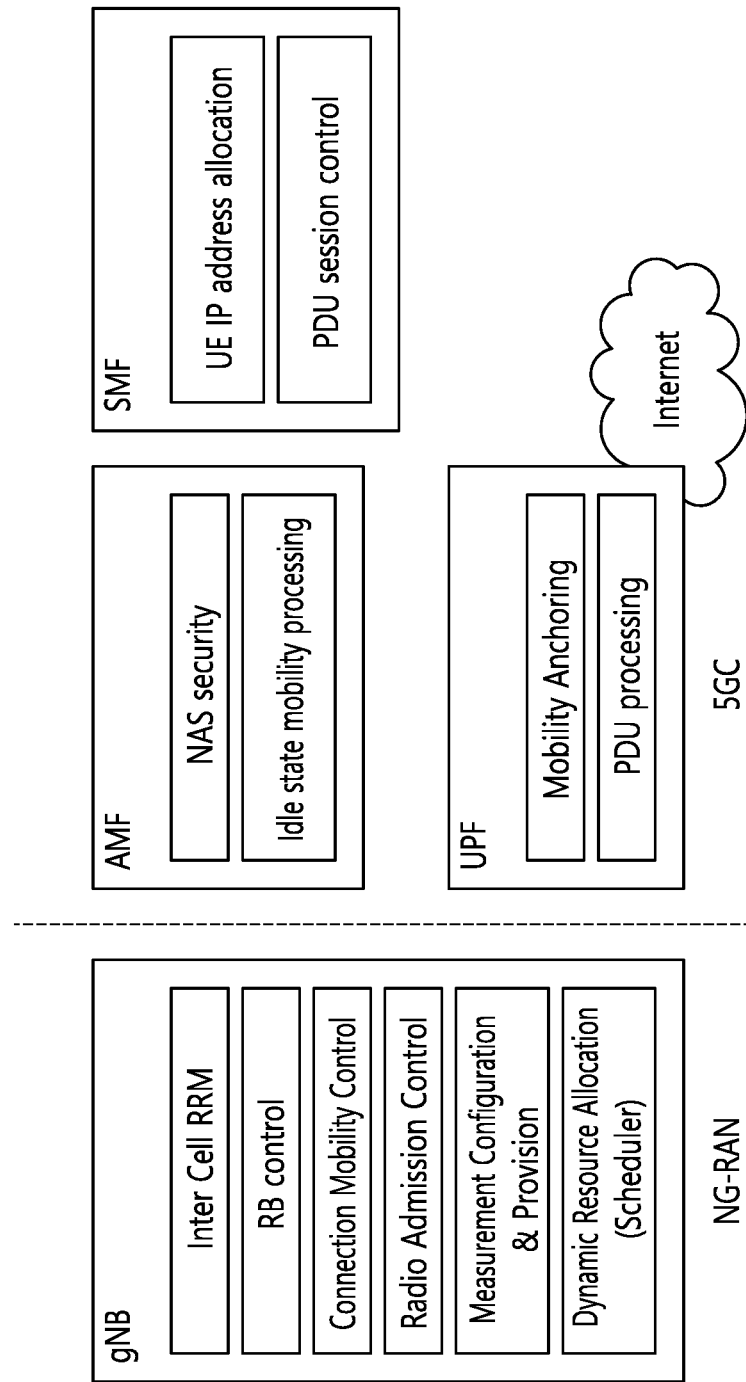
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
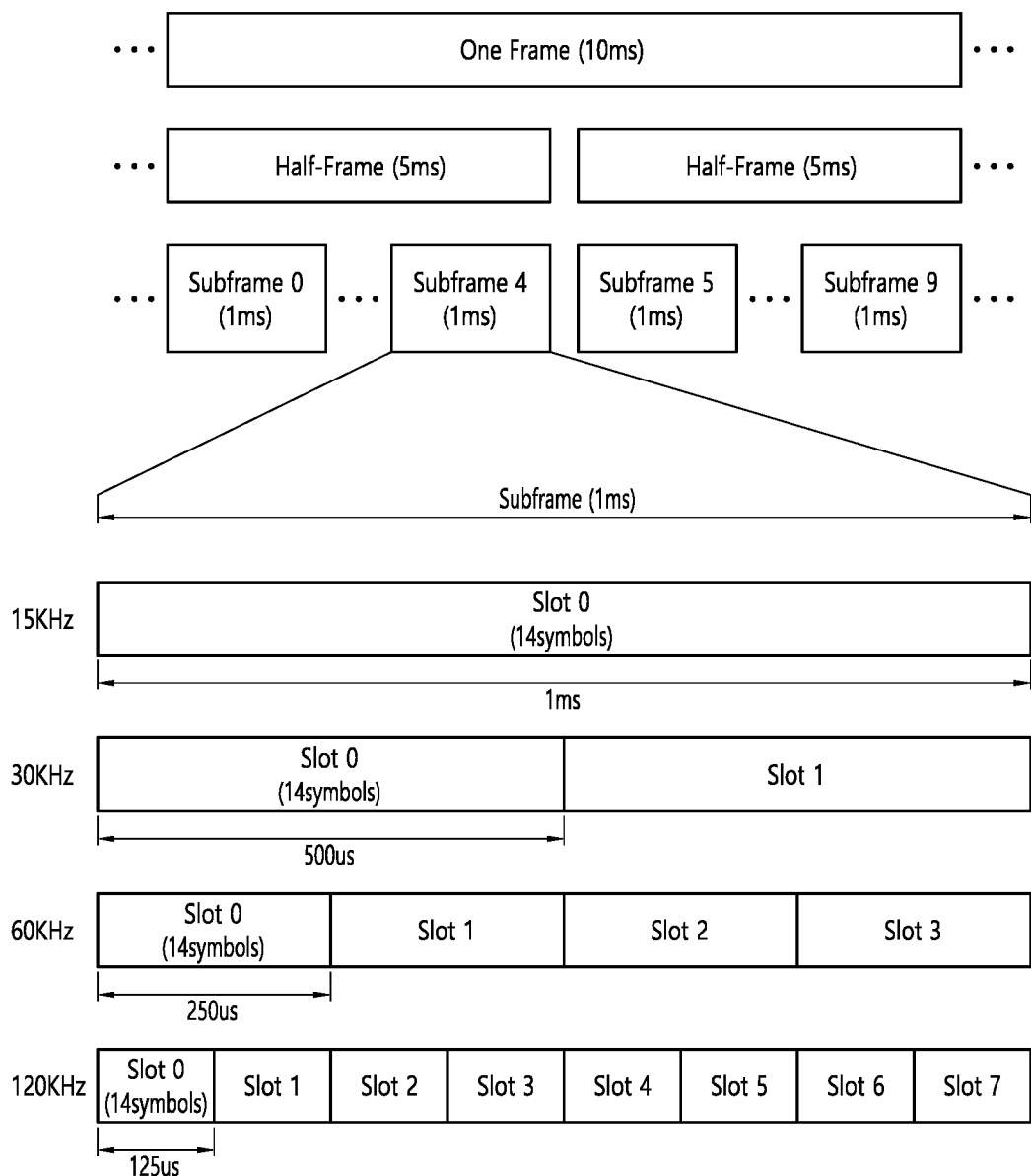
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame, u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
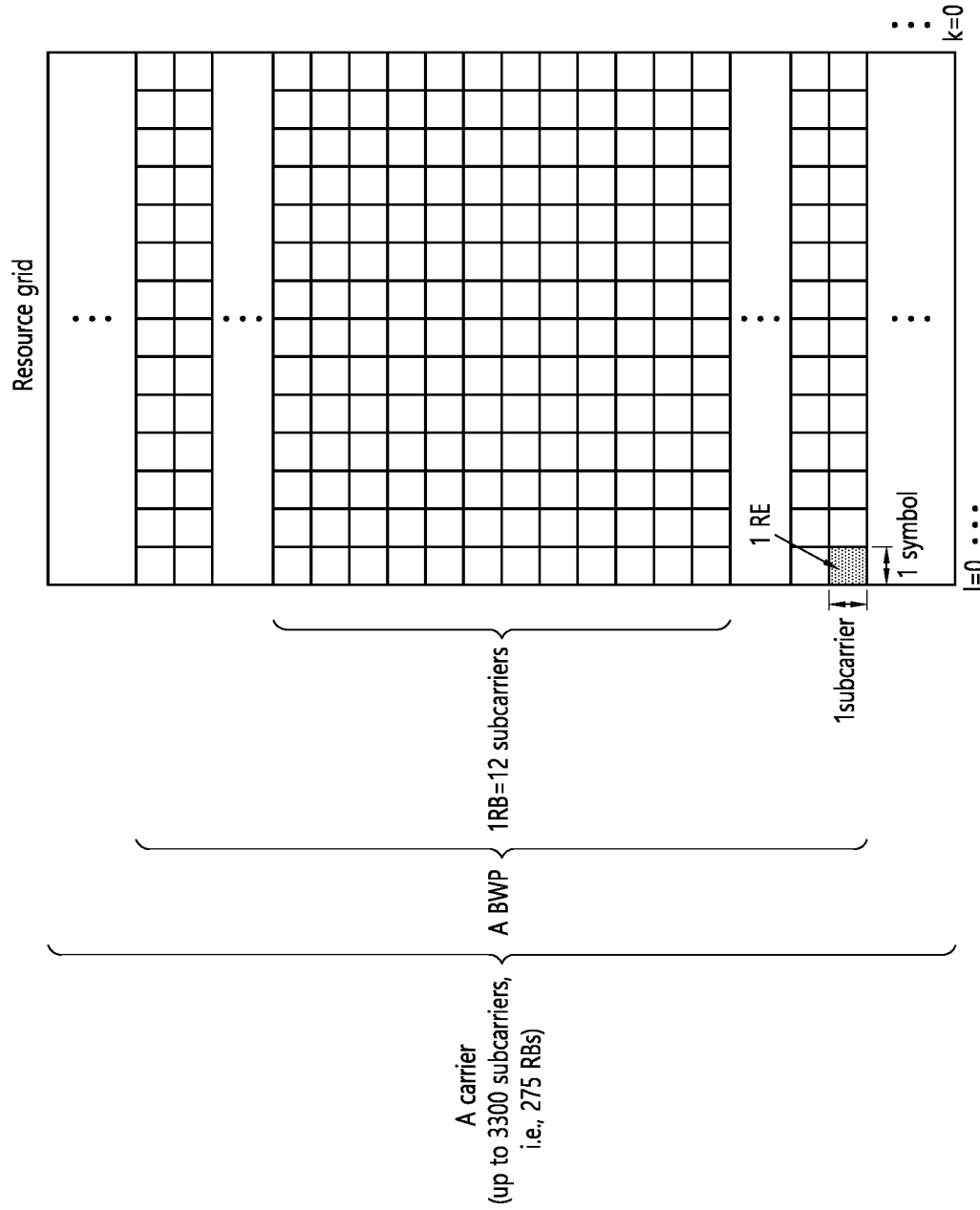
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
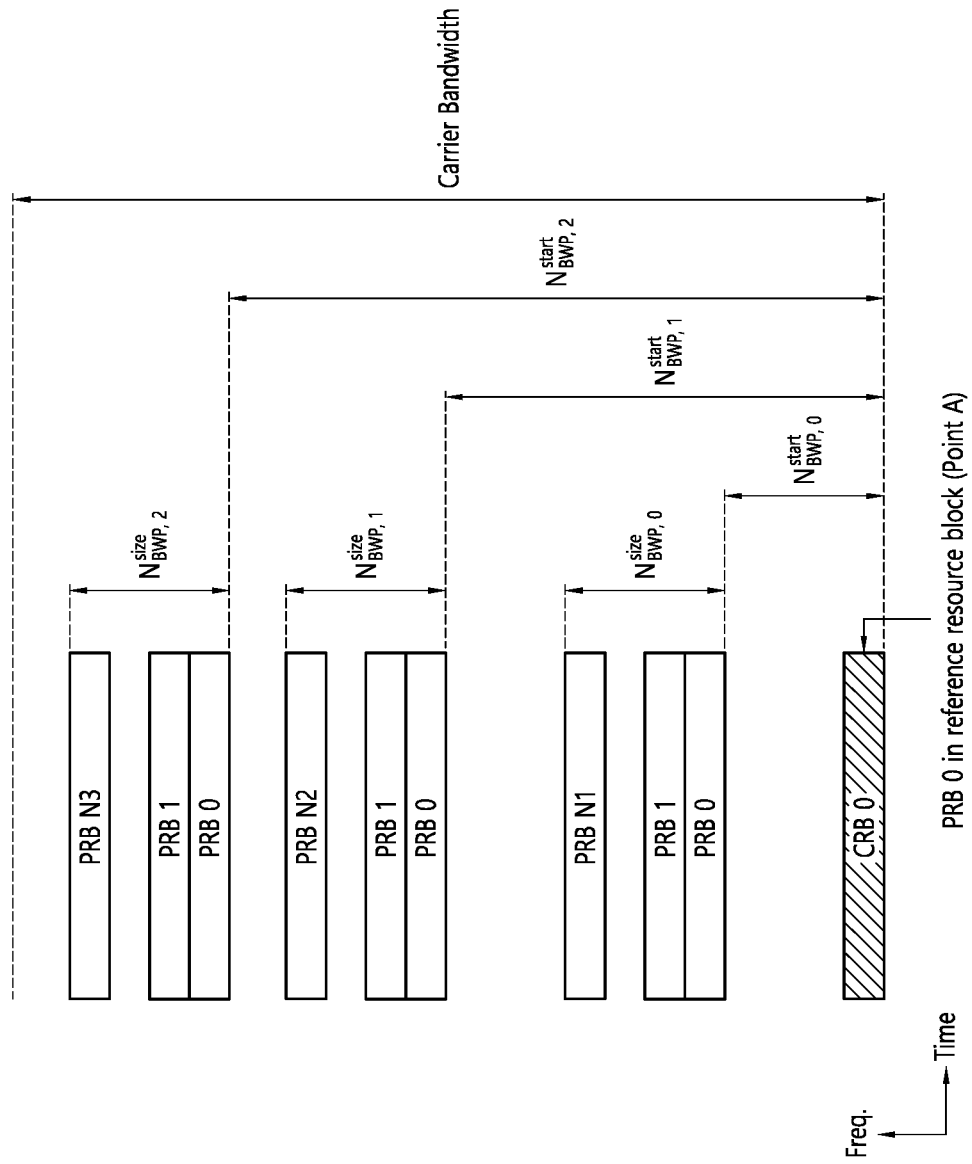
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
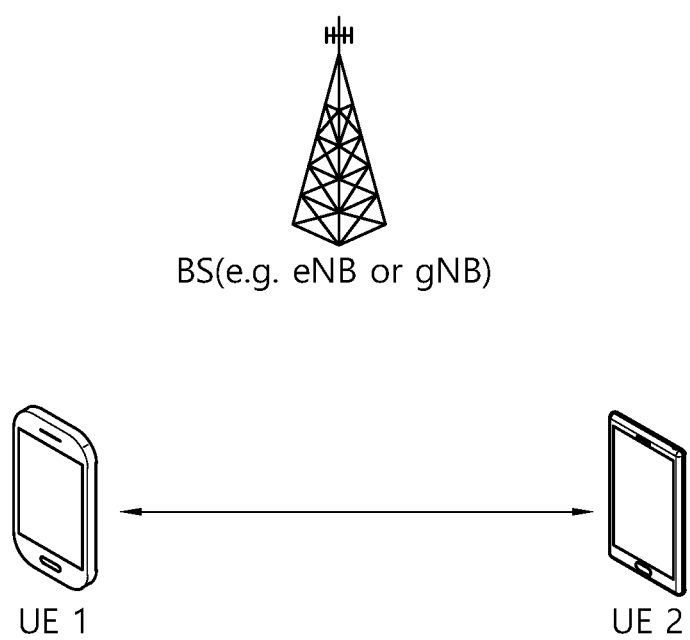
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
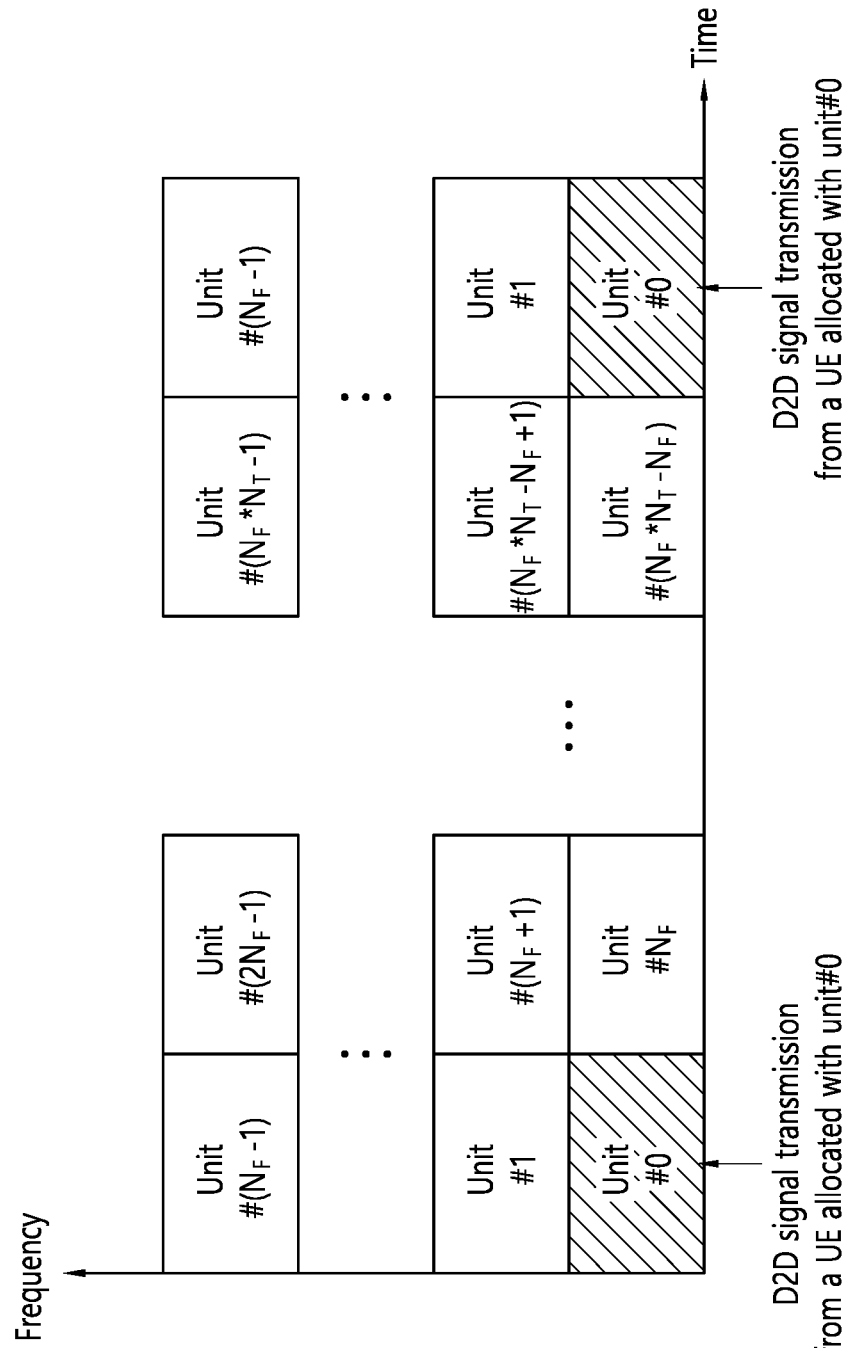
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into $N_F$ resources, and all time resources of the resource pool may be divided into $N_T$ resources. Therefore, $N_F*N_T$ resource units may be defined in the resource pool. FIG. A12 may show an example of a case where a corresponding resource pool is repeated with a period of $N_T$ subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel.

(2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
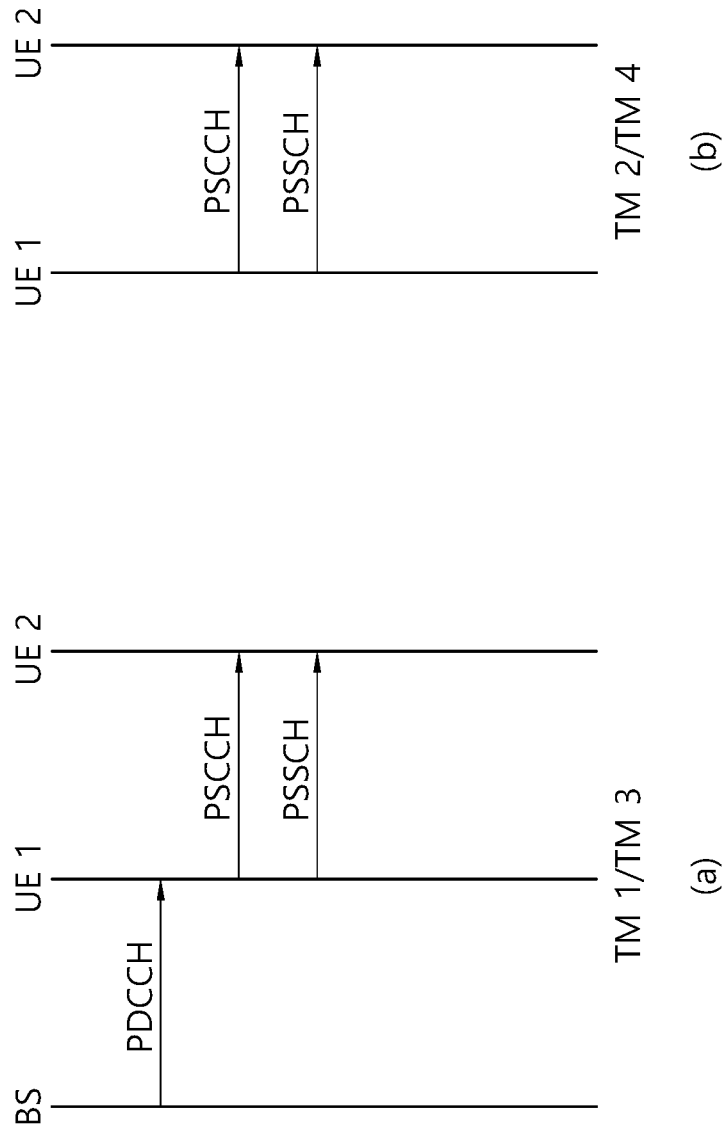
FIG. 13 shows exemplary UE operations according to a transmission mode (TM) related to V2X/D2D in accordance with an embodiment of the present disclosure.

FIG. 13 shows exemplary UE operations according to a transmission mode (TM) related to V2X/D2D in accordance with an embodiment of the present disclosure. (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
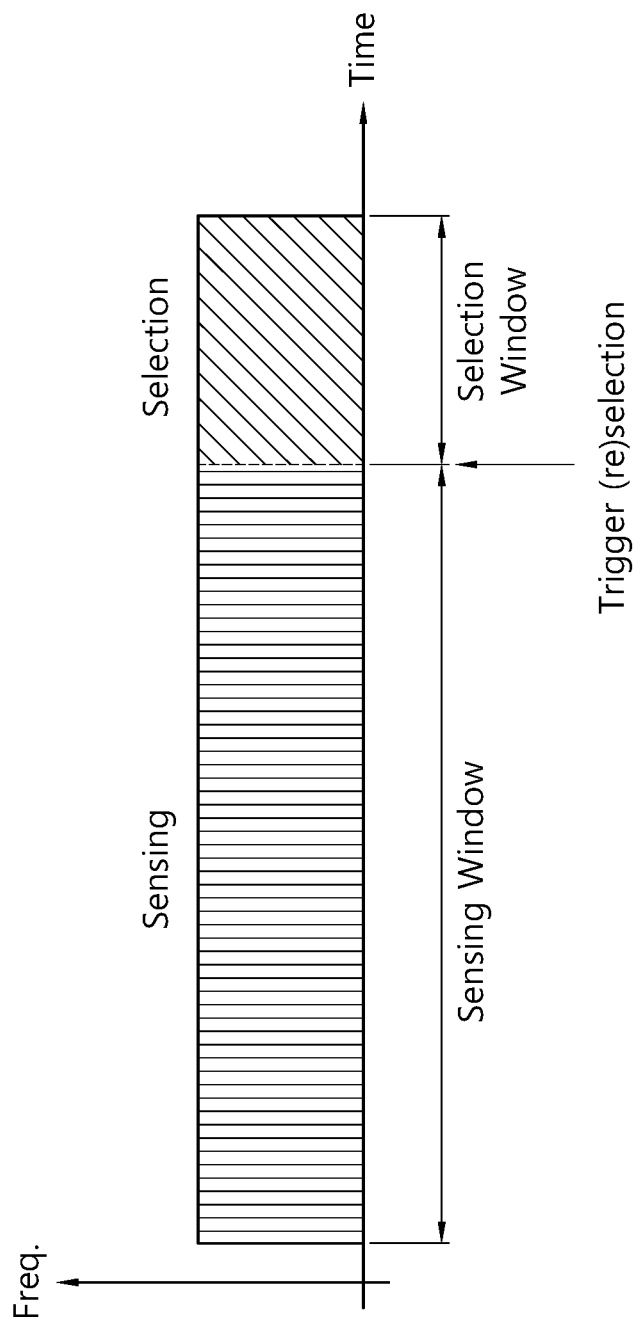
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback may be enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, the proposals of the present disclosure will be described in more detail.

The following drawings are prepared for describing one specific example of the present disclosure. A name of a specific device or a name of a specific signal/message/field disclosed in the drawings is exemplarily presented, so a technical feature of the present disclosure is not limited to a specific name used in the following drawings.

The present disclosure proposes a method for actively protecting a person to be protected through communication between devices or a communication method through an infrastructure/network that is less sensitive to power consumption than general VRU devices and has excellent computational processing capability when moving between vulnerable road users (VRUs) consisting of guardians and guardians, VRU may be vulnerable to traffic accidents, injuries, etc., compared to a general vehicle on the road, and may mean traffic weak people with low mobility or speed. Among VRUs, vulnerable VRUs such as small children and pets have little ability to recognize traffic conditions and protect themselves. However, the guardian may not be able to completely protect the vulnerable VRUs at every moment, and a sudden situation that may occur in an instant may be fatal to the vulnerable VRU.

The VRU devices may prevent a safety accident by transmitting a warning message or the like to the VRU user or surrounding vehicles. However, vulnerable VRUs may not understand the messages appearing through the VRU device. Therefore, if a device of a vulnerable VRU performs the same operation as a device of a normal VRU, the vulnerable VRU may not be able to cope with a dangerous situation. Therefore, it is necessary to always monitor the status of the vulnerable VRU by the M-VRU (Master-VRU), prevent an emergency situation, and notify immediately when an emergency situation occurs, furthermore, there is a need for a method that allows surrounding vehicles to more reliably recognize a situation that has occurred or may occur due to a vulnerable VRU.

The present disclosure describes a method for maintaining a cluster in a moving situation of a VRU cluster configured by pre-registration between known VRUs having a relationship between a guardian and a guardian. In addition, the present disclosure proposes a cluster creation method in various mobility situations among members and a method in which VRUs maintain a cluster and update cluster information based on previously received information in a situation where VRUs move. In addition, when some VRUs fail to maintain a cluster, a method for preventing an accident by detecting VRU departure information within the cluster or sharing it with the outside is proposed. Meanwhile, in the present disclosure, mobility may include velocity, speed, movement direction, distance between devices, and the like.

As well as P2P (pedestrian-to-pedestrian) communication that shares a safety message between pedestrian terminals, the method proposed by the present disclosure includes infrastructure-to-pedestrian (I2P) and network-to-pedestrian (N2P) communication for receiving VRU protection information and the like from a surrounding infrastructure/network. Messages transmitted by VRUs may be collected by P2I, P2N methods, etc. from infrastructure/network, etc. in order to be transmitted not only to neighboring vehicles, but also to approaching vehicles or vehicles in blind spots. In order to respond to VRUs such as pet dogs and small children who have weak cognitive function or do not understand the meaning of the message displayed through the VRU device, if the VRUs depart from their guardians, a VRU device or infrastructure/network, etc., notifies the guardian by detecting the departure of the cluster or infrastructure/network, etc. may inform vehicles around the VRU to directly recognize a dangerous situation.

Figure 15:
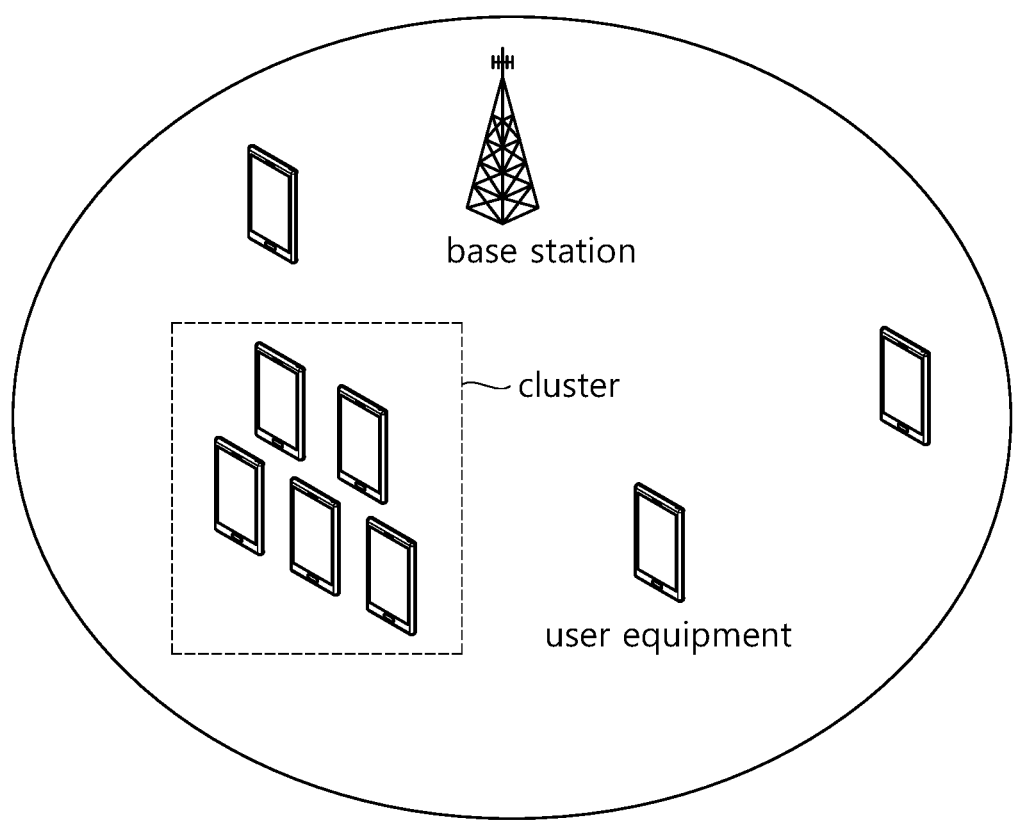
FIG. 15 is for explaining a cluster.

FIG. 15 is for explaining a cluster. Here, the cluster may refer to a group in which VRUs are connected to each other and operate as one system or one terminal. Also, clustering may refer to an act of creating/forming the cluster.

FIG. 15 is an assumption that a plurality of terminals exist within the coverage of the base station. Referring to FIG. 15, some terminals among a plurality of terminals within coverage may be clustered to configure one cluster. As a condition of cluster configuration, a similar level of movement velocity, movement direction, etc. can be considered.

Meanwhile, although FIG. 15 shows only clusters within the coverage of the base station, this is only an example, and clusters may be created between terminals belonging to different coverages. Also, here, each of the terminals constituting the cluster may be a terminal that satisfies a configuration condition. For example, the movement velocity of each of the terminals constituting the cluster may be similar and may not exceed a velocity-related threshold. In addition, each of the terminals constituting the cluster may be a terminal located within a predetermined distance from the center of the cluster.

Hereinafter, a method for configuring a cluster will be described.

As an example, in the case of VRUs configured as guardians and objects of protection, after the guardian VRU (hereinafter, M (master)-VRU) controls devices of VRUs (hereinafter, V (very)-VRUs) to be protected or searches for devices of V-VRUs, it can be configured as one VRU group or cluster. Specifically, when a cluster is configured, the M-VRU may become a representative of the cluster and communicate with the base station or perform cluster management such as configuration and release of the cluster. The following operations may be performed according to the characteristics of the VRU device.

With respect to cluster configuration, a cluster may be formed between VRUs that are not related to each other. Alternatively, the M-VRU or the representative VRU may register the V-VRUs in the cluster. For example, a group such as a family consisting of M-VRUs and V-VRUs rather than a VRU cluster consisting of arbitrary VRUs may be pre-configured as a cluster.

In relation to cluster consisting, the following cases may exist.

(Case 1) when VRU Members Use the Same Device and the Same Application

With respect to case 1, a case in which the V-VRU is dependent on the M-VRU may be considered.

Specifically, in a user experience (Ux) situation on an application or on a system related to clustering, an M-VRU or V-VRU may request clustering and scan another user's device. When cluster registration is allowed, cluster consisting of M-VRU and V-VRU is established, and related information can be transmitted over the network. For example, based on a list containing, for example, an identifier (ID) that can identify another member's device, such as an address book, the M-VRU can search for a member such as V-VRU and send a message to that member, the member who receives the message can perform an appropriate action by sending a response message or pressing a button.

(Case 2) when M-VRU is a General Device and V-VRU is a Device that is Dependent on M-VRU In relation to case 2, a case in which the M-VRU discovers a device of the V-VRU and performs registration and pairing may be considered.

Specifically, when the device of the V-VRU is turned on, when the device of the V-VRU is tagged with the device of the M-VRU by near field communication (NFC), etc., or when the mobility of M-VRU and V-VRU is similar, a mutual connection can be established. Here, the case in which mobility between devices is similar may mean a case in which velocity, direction, etc. are similar within a specific error range or a case in which the distance between devices is less than or equal to a specific threshold. On the other hand, when cluster consisting is completed, related information may be transmitted to the network.

Figure 16:
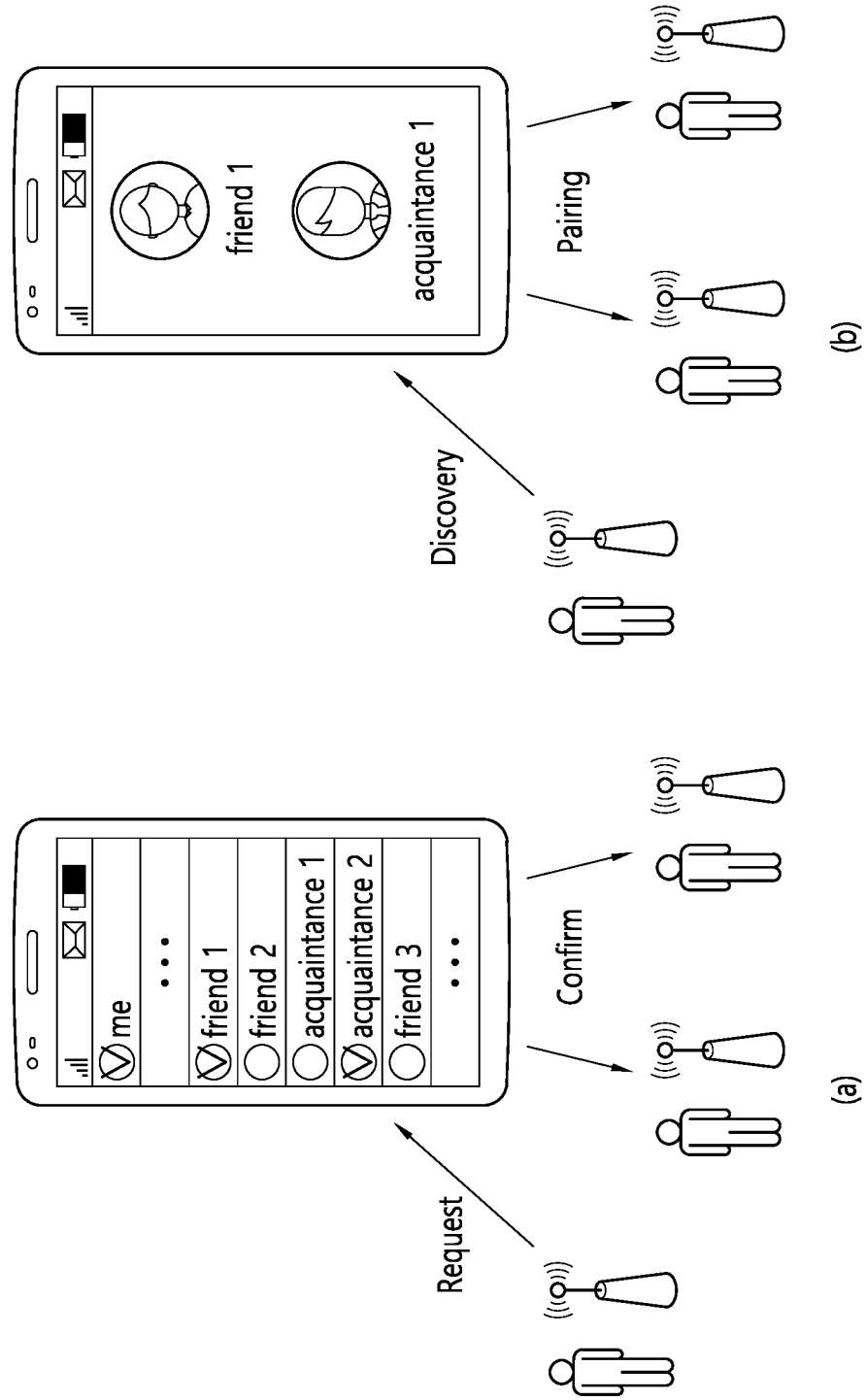
FIG. 16 schematically shows examples of constituting a cluster.

FIG. 16 schematically shows examples of constituting a cluster. Specifically, (a) of FIG. 16 schematically shows an example of case 1, (b) of FIG. 16 schematically shows an example of case 2.

Referring to (a) of FIG. 16, a specific user can request a cluster consisting of other users in the address book or list displayed in the application, etc. by using the user's own device. The other users using the same application can receive the request message, a cluster consisting request can be accepted through an indication of acceptance, such as a response message. A cluster is created through the above process, and related information may be transmitted to the network.

Referring to (b) of FIG. 16, a specific user can search for other users using the user's own device. Then, when other users are found, the user may register other users or perform pairing. A cluster is created through the above process, and related information may be transmitted to the network.

Meanwhile, after the VRU detects mobility and operates in the VRU mode, it can detect a neighboring cluster (a normal cluster or a free cluster) and join the cluster. Alternatively, the VRU may detect an existing subscribed cluster (e.g., a subscribed cluster) and join the cluster. In a situation in which the M-VRU and V-VRU constituting the subscription cluster are moved, the process of recognizing and clustering the members of the cluster at the beginning may occur, in addition, some members, particularly V-VRUs, may leave while maintaining the cluster or moving while maintaining mobility. In this case, in order to prevent an accident, it is necessary to notify the M-VRU as well as the surrounding network and/or vehicles.

Hereinafter, the VRU mode will be described. Here, the VRU mode may be a mode in which cluster consisting and/or subscription is allowed to protect the VRU.

It may enter VRU mode because the VRU moves only indoors, or move out of a VRU protected area, or the VRU unit is not moving and then relocates to an outdoor area or VRU protected area, or VRU mobility detection, etc.

Here, the specific area-related information is predefined and stored in a high definition map (HD MAP) or the like, or may be transmitted from a higher network to the terminals through a road side unit (RSU), an eNB, a gNB, etc. Whether a VRU is indoors or in a VRU protected area can be checked through comparing VRU location information obtained from GPS, Wi-Fi hotspot, etc. with VRU mapping information on HD MAP, or area-related information received from networks, etc. Based on this information, it is possible to enter VRU mode only in outdoor areas designated as VRU protected areas, among indoor areas, it is possible to switch to VRU mode or lost child prevention mode in indoor places other than frequently visited or pre-designated places such as home and school. In addition, mobility may be detected through an acceleration sensor, a gyro sensor, a geomagnetic sensor, or a GPS sensor capable of measuring a location of the VRU device. Meanwhile, the VRU protection zone may include a hazardous area such as a school zone, a crosswalk, and a driveway.

Hereinafter, cluster detection will be described.

In a situation where M-VRU and V-VRU move together, the M-VRU directly coordinates the devices of the V-VRU, or the M-VRU runs clustering mode on the devices of the M-VRU, etc., it can directly input the context to communicate the movement status of the cluster to the network and/or peripheral devices. However, if the M-VRU and V-VRU are not moving together, it may be necessary for the M-VRU to detect the operation of the V-VRU or for the V-VRU to detect the operation of the M-VRU and take an action corresponding thereto. The cluster detection operation can be performed in the following situations.

(Situation 1) When M-VRUs do not move and at least one V-VRU with the same or more V-VRUs moves: When V-VRU mobility is detected or the base station receives a message transmitted periodically by the V-VRU or a message transmitted through a scheduled resource, or the device of the V-VRU detects its own mobility through GPS, accelerometer, gyro sensor, etc., for the corresponding event, the corresponding situation is directly transmitted to the base station, and the network provides a notification message to the device of the M-VRU. As a specific example, the movement of the V-VRU may be detected while periodically receiving a message containing location information and velocity information or periodically receiving a beacon, a reference signal, and the like.

(Situation 2) When M-VRU moves and V-VRU does not: The base station may periodically receive a message containing the location of the V-VRU(s), mobility-related information, or the like, or may receive a report from the V-VRU and instruct the M-VRU when an event related to mobility occurs. In this case, if the V-VRU does not move, the base station notifies the M-VRU that the V-VRU is in a static state or does not perform a special operation. On the other hand, the base station informs the V-VRUs about the movement status of the M-VRUs. Afterwards, when a change in the location, mobility, etc. of the V-VRU is detected, the base station receives a mobility-related message from the V-VRU as described above, the base station may inform the device of the M-VRU of the movement of the V-VRU through a notification message or the like.

(Situation 3) When an M-VRU and at least one same or more V-VRUs move together: As described above, through the method in which the M-VRU directly controls the device of the V-VRU or the M-VRU directly inputs the situation to the device of the M-VRU, etc., the movement status of the corresponding cluster may be communicated to the network and/or peripheral devices. Alternatively, the M-VRU and V-VRU may each transmit mobility-related information to a base station by combining the above methods. Thereafter, a network-based VRU clustering operation may be performed.

Hereinafter, clustering will be described.

Clustering may be performed by the VRUs themselves, or may be performed by the base station.

The base station may check the clustering condition of each VRU and directly determine whether to cluster. Here, for example, the clustering condition may be satisfied when the distance between the specific VRU and the representative VRU (e.g., M-VRU) or the distance from the specific VRU and the central location of the cluster is less than or equal to a specific threshold, the reception level (e.g., RSRP) for a transmitted signal (eg, PSM message) is equal to or above a certain threshold, or the difference in velocity, directionality, etc. of the representative VRU and/or cluster is below a certain threshold.

As a specific example of clustering, the base station may scan pre-registered M-VRUs and V-VRUs, as well as VRUs around the base station. Here, the scan operation may be performed periodically. During the scan operation, the base station may detect VRUs in which mobility has occurred, by determining whether VRUs belonging to the same cluster or having the same cluster identifier (ID) exist among the VRUs, if present, it may be determined whether the clustering condition for the corresponding VRUs is satisfied. For this, each of the VRUs transmits only the basic container of the PSM message when not in VRU mode, when performing VRU mode or clustering, an additional container (optional container) may be additionally transmitted. In this case, a cluster ID related field may be added to the additional container of the PSM message to identify the cluster registered in advance. Here, the cluster ID related field may be a 16-bit or 32-bit ID based on a user ID of an M-VRU and/or a V-VRU, the user ID may be an International Mobile Equipment Identify (IMEI), an International Mobile Subscriber Identity (IMSI), or the like. Also, when a specific VRU belongs to only one cluster, the cluster ID related field may be the user ID itself. Meanwhile, in base station-based clustering, unlike VRU-based clustering, separate transmission and reception of messages such as joining request and approval may not be required for clustering.

On the other hand, in a situation where base station-based clustering is applied, when a predetermined representative VRU transmits a PSM message alternately between VRUs instead of transmitting a PSM message, there is a need for a method in which the VRU or the like can recognize the order in which messages are transmitted and the size of the cluster. That is, in the case described above, the effect of increasing the transmission period of the PSM message of each of the VRUs occurs. Each of the VRUs should be able to know how much the period increases, when the increased period is applied (i.e., whether a transmission offset is applied), and how the transmission order is set in the cluster.

To this end, before cluster consisting of all VRUs, the cluster size is 1 and the counter is 0, and while the counter is changed, the VRUs can operate similarly to their own clustering method. Or, regardless of the above-mentioned counter value, through communication between the base station and the VRU, the transmission period and the time of application of the increased period may be determined by an indication of the base station or a declaration of each of the VRUs.

First, when the VRUs themselves determine the cluster size and counter, for example, in the case of a subscription cluster, the transmission order may be predefined. For example, when a specific subscription cluster consists of four VRUs (VRU1, VRU2, VRU3, VRU4), the transmission order may be predefined in the order of VRU1, VRU2, VRU3, VRU4.

Here, the relative transmission order may be determined according to the VRU configuration at a specific time point. For example, in the above case, when a cluster consisting of VRU2 and VRU4 moves, VRU2 may be a representative VRU, by collecting the PSM message, information indicating that the cluster size is 2 may be transmitted to vehicles and networks inside and/or around the cluster. In this case, the VRU4 may also know in advance that the cluster size is 2 by collecting the PSM message. Meanwhile, in the above case, the counter value of VRU2 may be 0, which is the highest order, and the counter value of VRU4 may be 1, which is the next order.

Here, each of VRU2 and VRU4 may adjust a PSM message transmission period and/or a transmission offset application time based on the cluster size. Here, each of the VRUs may simply apply a transmission offset at an arbitrary time, or may apply the same transmission offset to each other, different transmission offsets may be applied. Also, here, the transmission resources used by each of the VRUs may be independent of each other.

Also, here, each of VRU2 and VRU4 may alternately transmit a PSM message based on a counter value from a set specific time point. In this case, the resources through which each of the VRUs transmit the PSM message may be the same.

Figure 17:
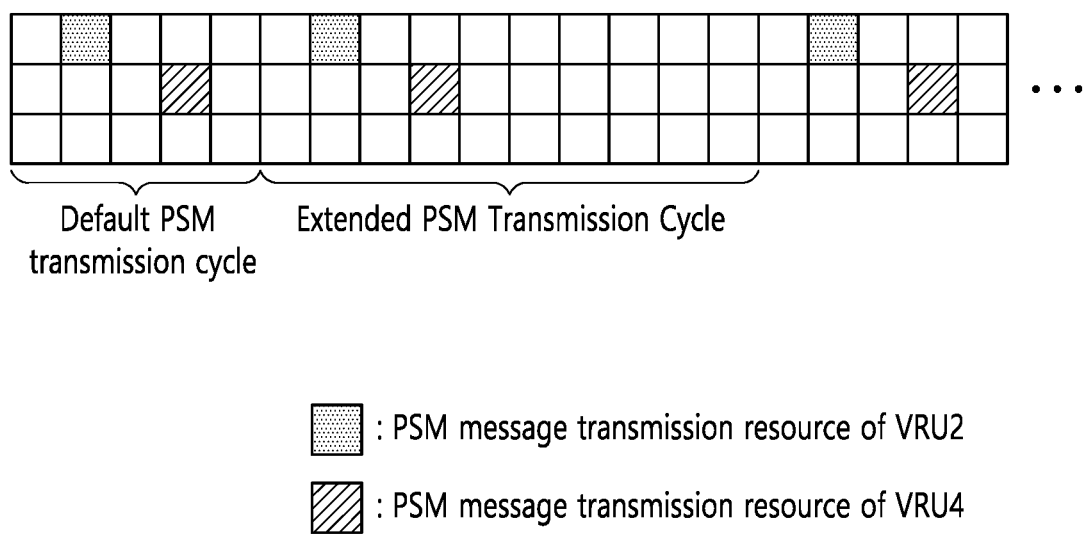
FIG. 17 schematically illustrates an example of a PSM message transmission method of VRUs constituting a cluster according to some implementations of the present disclosure.

FIG. 17 schematically illustrates an example of a PSM message transmission method of VRUs constituting a cluster according to some implementations of the present disclosure. Specifically, as described above, FIG. 17 is an example of a case where VRU2 and VRU4 constitute one cluster, and the transmission order of VRU2 is earlier than that of VRU4.

Referring to FIG. 17, the basic PSM transmission period of VRU2 and VRU4 is 1 second. Here, the VRU2 may transmit a PSM message including information indicating that the cluster size is 2 within the basic PSM transmission period. In this case, the counter of VRU2 may be set to 0, and the counter of VRU4 may be set to 1. Thereafter, within the basic PSM transmission period, VRU4 receives the PSM message of VRU2 and knows that the cluster size is 2, a PSM message may be transmitted on a transmission resource allocated to VRU4.

After that, cluster consisting is completed, and VRU2 and VRU4 can select the same transmission offset. Referring to FIG. 17, VRU2 and VRU4 may select a transmission offset of 0, and an extended PSM transmission period may be 2 seconds. Accordingly, VRU2 and VRU4 may each transmit a PSM message within an extended PSM transmission period. Meanwhile, each of VRU2 and VRU4 may periodically transmit a PSM message on a transmission resource configured to each of VRU2 and VRU4.

Figure 18:
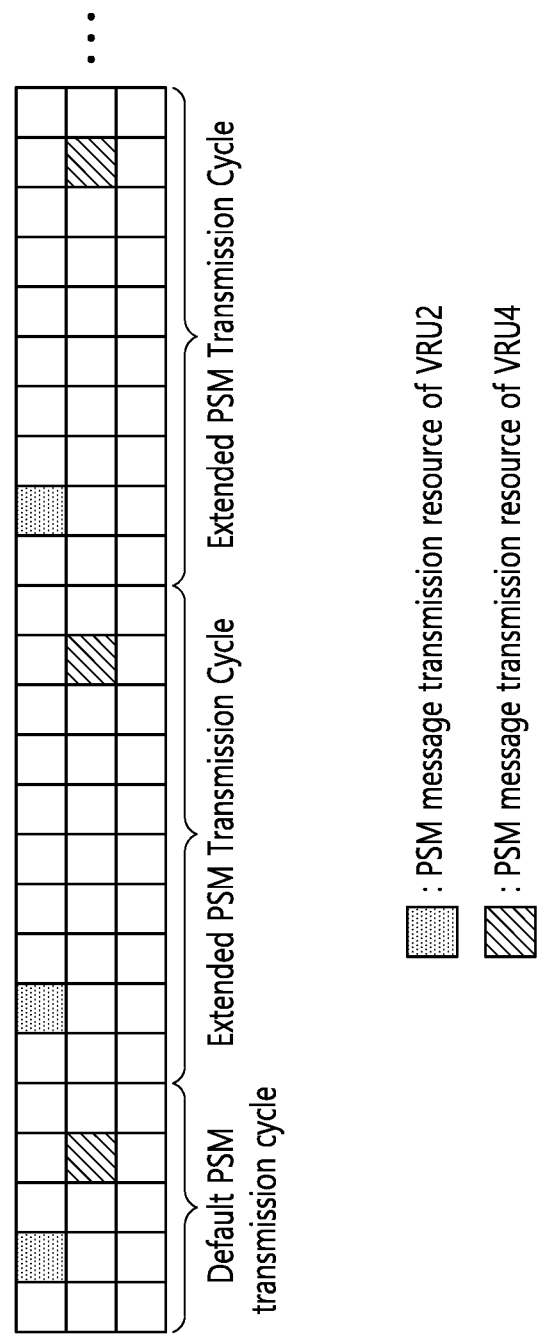
FIG. 18 schematically illustrates another example of a PSM message transmission method of VRUs constituting a cluster according to some implementations of the present disclosure.

FIG. 18 schematically illustrates another example of a PSM message transmission method of VRUs constituting a cluster according to some implementations of the present disclosure. Specifically, as described above, FIG. 18 is an example of a case in which VRU2 and VRU4 constitute one cluster, and the transmission order of VRU2 is earlier than that of VRU4.

Referring to FIG. 18, the basic PSM transmission period of VRU2 and VRU4 is 1 second. Here, the VRU2 may transmit a PSM message including information indicating that the cluster size is 2 within the basic PSM transmission period. In this case, the counter of VRU2 may be set to 0, and the counter of VRU4 may be set to 1. Thereafter, within the basic PSM transmission period, VRU4 receives the PSM message of VRU2 and knows that the cluster size is 2, a PSM message may be transmitted on a transmission resource allocated to VRU4.

After that, cluster consisting is completed, and VRU2 and VRU4 can select different transmission offsets. Referring to FIG. 18, VRU2 may select a transmission offset of 0, VRU4 can choose the transmit offset to be 1, the extended PSM transmission period may be 2 seconds. Accordingly, VRU2 and VRU4 may each alternately transmit a PSM message within an extended PSM transmission period. Meanwhile, each of VRU2 and VRU4 may periodically transmit a PSM message on a transmission resource configured to each of VRU2 and VRU4.

Figure 19:
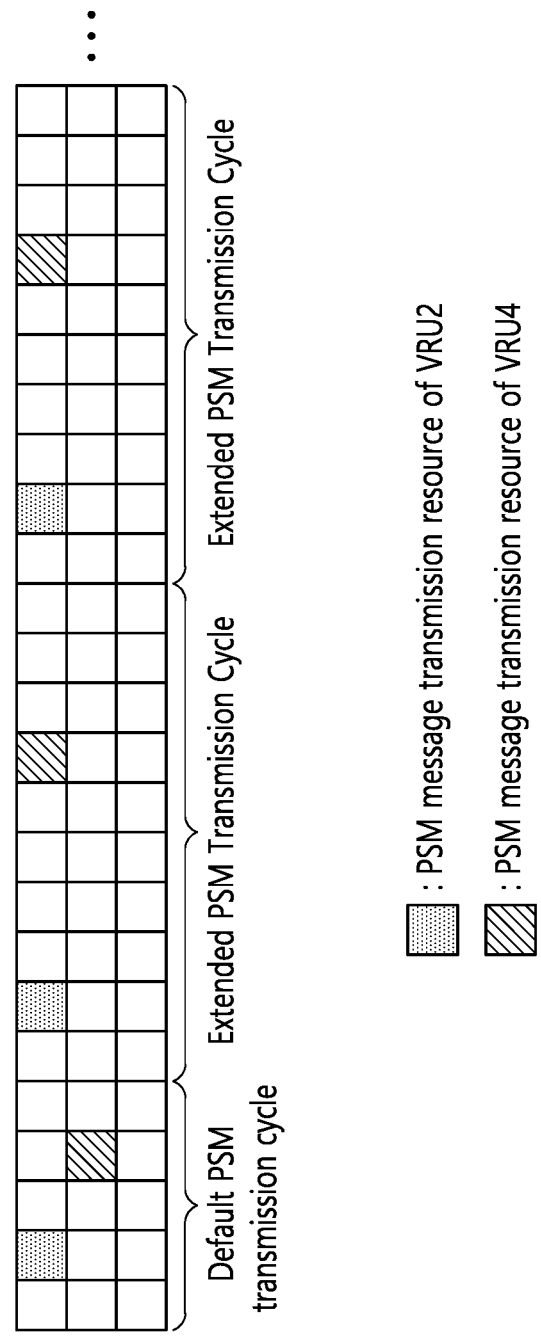
FIG. 19 schematically illustrates another example of a PSM message transmission method of VRUs constituting a cluster according to some implementations of the present disclosure.

FIG. 19 schematically illustrates another example of a PSM message transmission method of VRUs constituting a cluster according to some implementations of the present disclosure. Specifically, as described above in FIG. 19, VRU2 and VRU4 constitute one cluster, this is an example of a case in which the transmission order of VRU2 is earlier than that of VRU4.

Referring to FIG. 19, the basic PSM transmission period of VRU2 and VRU4 is 1 second. Here, the VRU2 may transmit a PSM message including information indicating that the cluster size is 2 within the basic PSM transmission period. In this case, the counter of VRU2 may be set to 0, and the counter of VRU4 may be set to 1. Thereafter, within the basic PSM transmission period, VRU4 receives the PSM message of VRU2 and knows that the cluster size is 2, a PSM message may be transmitted on a transmission resource allocated to VRU4.

Meanwhile, referring to FIG. 19, after cluster consisting, VRU2 and VRU4 may transmit a PSM message using the same transmission resource. Specifically, after VRU4 having a higher counter value applies the updated cluster parameter, VRU2 and VRU4 may transmit a PSM message using the same transmission resource. At this time, in order to distinguish the PSM message transmission subject, the message counter (msgCnt) of the PSM message transmitted by VRU2 may be set to 0, the message counter (msgCnt) of the PSM message transmitted by the VRU4 may be set to 1.

Hereinafter, cluster message transmission will be described.

As an example, a case in which each of all VRUs constituting a cluster periodically transmits a PSM message may be considered. The base station may acquire mobility information of all VRUs every PSM message transmission period, cluster information may be updated every PSM message transmission period based on the mobility information. Therefore, the VRUs do not need to generate and transmit separate cluster information to the base station, the base station itself can generate accurate cluster information every PSM message transmission period. In this case, the base station may determine whether each of the VRUs satisfies a cluster maintenance condition and/or a cluster departure condition at each PSM message transmission period. In particular, when the VRUs transmit a PSM message including only a basic container including only the mobility of each VRU to the base station, cluster-related information may not be included in the PSM message. Accordingly, it is possible to use relatively few resources, and efficient use of radio resources is possible. Here, as an example, the base station may transmit a message including the cluster information to the VRUs and surrounding vehicles. Also, here, as an example, each of the VRUs or the base station may transmit a PSM message including cluster information or may transmit a separate message including cluster information. At this time, the base station does not transmit a message including cluster information every PSM message transmission period, it can also be transmitted when necessary (e.g., when a specific event occurs). As a specific example, when the interference of radio resources due to V2X messages, etc. increases because there is a lot of traffic by surrounding vehicles, VRUs, etc., the transmission period of the message including cluster information may be changed to be relatively long.

As another example, a case in which VRUs constituting a cluster alternately transmit PSM messages may be considered. In this case, since VRUs constituting the cluster do not transmit PSM messages every PSM message transmission period, the greater the number of VRUs constituting a cluster, the greater the difference between VRU information and the lower the accuracy. Also, the cluster information cannot obtain an accurate value in real time and must be estimated based on the given information. Therefore, it is possible to determine whether the VRU has left the cluster by comparing the estimated information with the latest information of the VRU (e.g., information when the VRU arrives at the time of transmitting the PSM message). The base station may transmit the updated cluster information through a PSM message or a separate message.

As another example, a case in which a representative VRU among VRUs constituting a cluster transmits a PSM message may be considered. In this case, when the remaining VRUs other than the representative VRU in the cluster do not transmit a PSM message or a message indicating the mobility of the VRU to the base station through the Uu interface, or when the message sent through the PC5 interface does not reach the base station, it may be difficult for the base station to estimate cluster information. Accordingly, at least within the cluster, VRUs share mobility information with each other or transmit mobility information to the representative VRU so that the representative VRU generates and updates information on the cluster, it is possible to detect cluster departures of other VRUs. Alternatively, another VRU that has received the PSM message of the representative VRU may directly detect whether the representative VRU has left the cluster and notify the representative VRU and/or the network. That is, when only the representative VRU transmits the PSM message or the cluster information related message in the cluster, the base station-based cluster message transmission operation may not be defined.

Hereinafter, cluster management will be described.

Cluster management may be performed based on mobility. For example, the M-VRU may transmit a safety message and the V-VRUs may receive the message and determine whether to leave the cluster based on the message. In this case, the base station may not separately perform an operation for cluster management. As another example, the M-VRU and the V-VRU may alternately transmit a safety message. The base station can update cluster information through the message as well as determine whether the VRU that has transmitted the safety message leaves the cluster. Meanwhile, in the above examples, the safety message may be a personal safety message (PSM).

Hereinafter, cluster departure detection will be described.

For example, when the base station detects a change in mobility of a specific VRU, the base station may transmit a warning message to the corresponding VRU as well as the M-VRU. When it is determined that only the M-VRU leaves the cluster within the cluster, the base station may transmit a warning message to the M-VRU and other VRUs. Meanwhile, the change in mobility may include a change in velocity equal to or greater than a threshold value, a change in directionality equal to or greater than a threshold value, or a case in which a distance from a cluster is equal to or greater than a threshold value.

Alternatively, when a VRU leaves a cluster near an M-VRU, the base station may transmit a warning message only to VRUs in the corresponding cluster. The range near the M-VRU may mean a range within a certain distance based on the M-VRU's viewing range or the center of the M-VRU and/or the cluster.

As a specific example of cluster departure, cases such as when the difference between the location of a specific VRU and the reference location of the cluster, such as the cluster center location or M-VRU acquired by the base station, is equal to or greater than the threshold value, when the V-VRU directly sends a cluster departure notification message to the base station, or when the M-VRU detects the departure of the V-VRU from the cluster and directly informs the base station of the departure of the V-VRU from the cluster may be included. Here, only when the above-mentioned cases continue for a predetermined time or longer, or when the base station directly communicates with the VRU (e.g., unicast or PC5 interface-based communication) and there is no same or abnormal response for a predetermined time, it can also be judged as a cluster departure.

When it is determined that a specific VRU has left the cluster, such as when the M-VRU or the center of the cluster deviates from the same or more than the threshold, the base station may transmit a warning message such as a warning about an unexpected situation to a peripheral device and/or a network. Specifically, the following operation may be performed to discover a VRU that has left the cluster.

First, the mobility of the VRU may be managed. Specifically, the mobility of the device of the VRU may be managed by an entity of the network, such as a base station and an MME, since the mobility of the VRU may depend on the mobility of the M-VRU when the VRU leaving the cluster is included in the subscription cluster, mobility management in consideration of these characteristics may be performed. As an example, there may be a V2X application server (or V2X application server) or V2X control function at the upper end of the base station and the MME, the V2X application server may already have information on the strayed cluster and the base station related to the VRU leaving the cluster. Accordingly, the network may inform the neighboring base station of the departure of the VRU and perform an operation for discovering the departure of the VRU.

As a specific example of the operation for VRU discovery, the network may request the traffic control center to adjust the signal around the moving path of the VRU leaving the cluster. Specifically, it may be requested to control a signal within a controllable range according to the moving direction, coverage, etc. of the VRU leaving the cluster. For example, in the case of a crossroads, rather than changing all four signals, some signals related to the direction of movement may be controlled by prematurely terminating the driving signal or notifying a warning situation. As a method of notifying a warning situation, repeated blinking of a green light may be considered.

As another specific example of the operation for VRU discovery, inspection/discovery of neighboring VRUs may be requested by an ADAS camera from neighboring vehicles. For a specific example, the network provides information about lost children, which is information about VRUs that have left the cluster, to nearby vehicles, and the vehicle itself uses artificial intelligence-based image recognition to check whether the VRU has been found. If found, the reading result and corresponding photo and video information can be transmitted to the network. As another example, surrounding vehicles acquire information about a VRU that has left the cluster, when an ADAS video included in the corresponding category is acquired, it is transmitted to the network, it allows the network to read whether a VRU has left the cluster.

Figure 20:
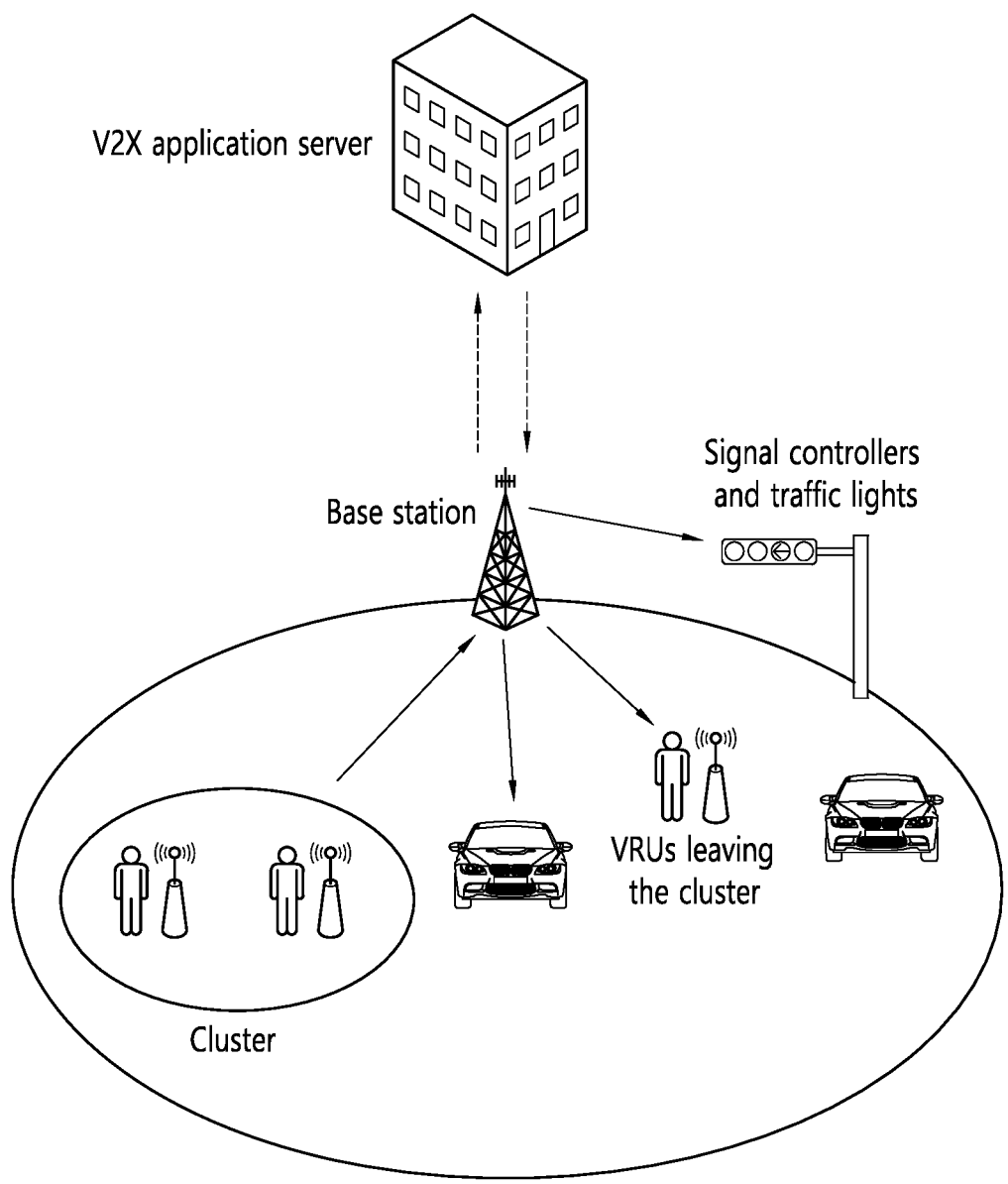
FIG. 20 is for explaining a cluster departure detection method according to some implementations of the present disclosure.

FIG. 20 is for explaining a cluster departure detection method according to some implementations of the present disclosure. Specifically, FIG. 20 assumes a situation in which a VRU leaving the cluster occurs after the cluster is formed, and the VRU leaving the cluster is located within the same cell coverage as the cluster.

Referring to FIG. 20, a VRU included in a cluster may notify the base station that a VRU leaving the cluster has occurred. The VRU notifying this may be an M-VRU or a VRU that first senses the existence of a VRU leaving the cluster.

When the base station receives information indicating that there is a VRU leaving the cluster from the VRU, it may transmit it to the V2X application server. The V2X application server may instruct the base station to transmit a warning message to the surrounding vehicle, the signal controller, and the VRU leaving the cluster, respectively, through information stored in advance. Specifically, the base station may inform the VRU leaving the cluster of leaving the cluster. In addition, as there is a VRU leaving the cluster, information on the VRU leaving the cluster may be transmitted to inform the discovery of the corresponding VRU. The base station may also instruct the signal controller to control the signal appropriately. Specific examples additionally applicable to the example of FIG. 20 are the same as described above, and thus overlapping descriptions will be omitted.

Figure 21:
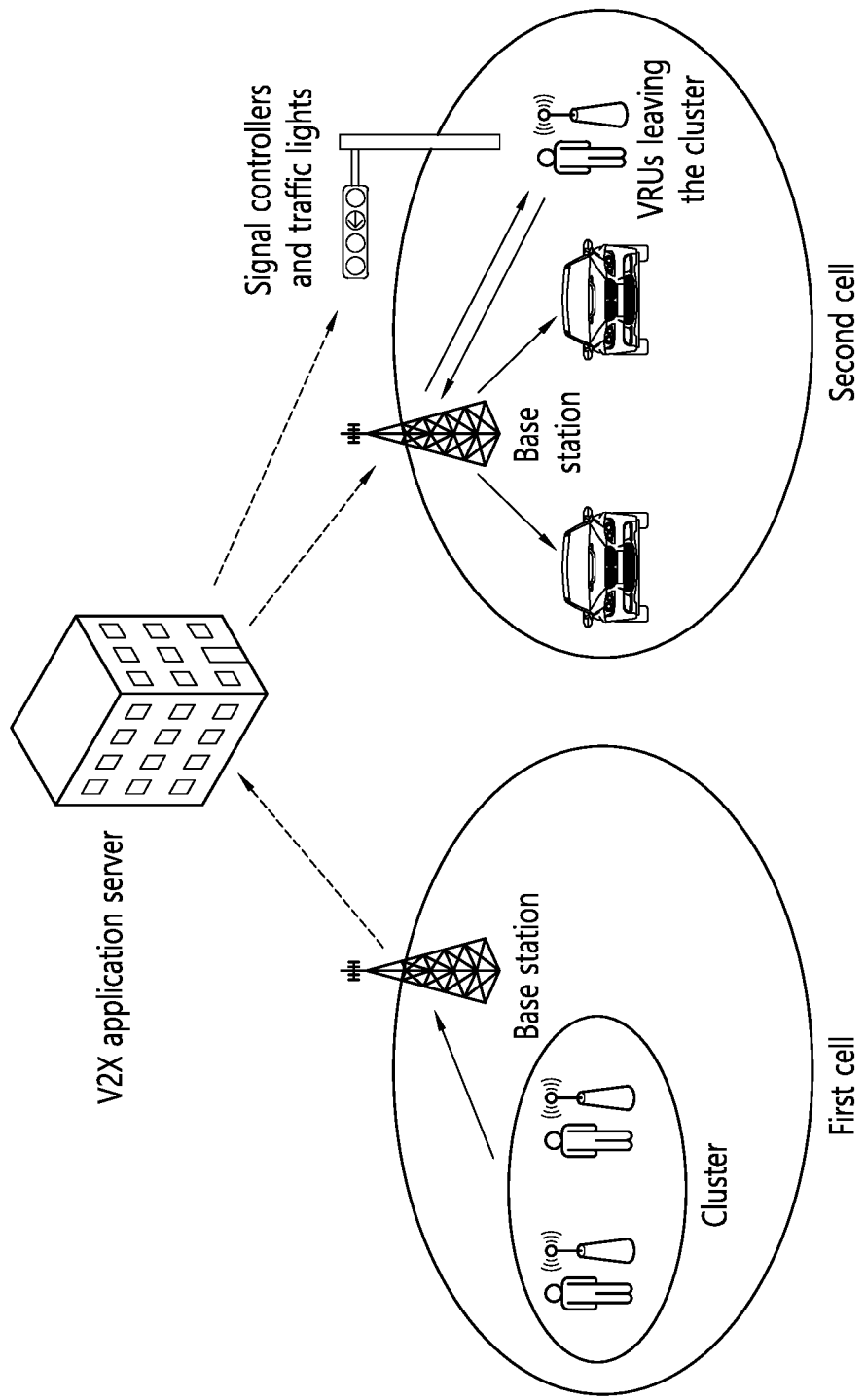
FIG. 21 is for explaining a cluster departure detection method according to some implementations of the present disclosure.

FIG. 21 is for explaining a cluster departure detection method according to some implementations of the present disclosure. Specifically, FIG. 21 assumes a situation in which a VRU leaving a cluster occurs after a cluster is formed, and the VRU leaving the cluster is located within a cell coverage different from that of the cluster.

In FIG. 21, unlike FIG. 20, when the base station controlling the first cell in which the cluster is located informs the V2X application server that the VRU has left the cluster, the V2X application server may detect the cell coverage of the second cell in which the VRU leaving the cluster is located based on a signal transmitted by the VRU leaving the cluster. Thereafter, the V2X application server may perform an appropriate operation for discovering the VRU leaving the cluster to the base station controlling the second cell. Specific examples thereof are the same as described above.

Figure 22:
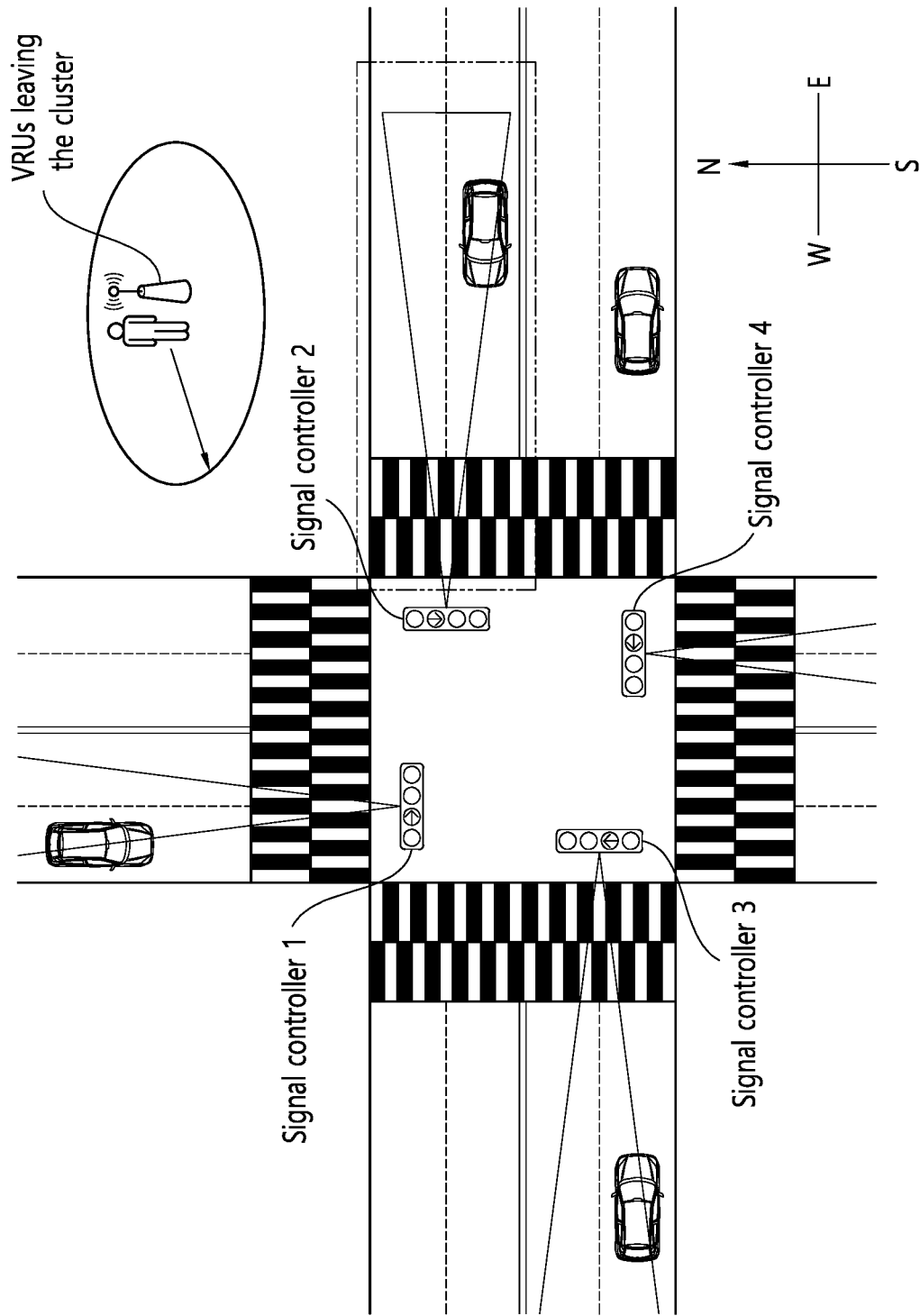
FIG. 22 schematically illustrates an example of a signal controller control method for protection of a VRU leaving a cluster according to some implementations of the present disclosure.

FIG. 22 schematically illustrates an example of a signal controller control method for protection of a VRU leaving a cluster according to some implementations of the present disclosure.

When the location of the VRU leaving the cluster is detected, the V2X application server may notify the traffic control center or the like to control the signal of the signal controller closest to the area where the VRU is located. Thereafter, the signal controller closest to the VRU leaving the cluster and/or the signal controller related to the moving direction of the VRU leaving the cluster may be controlled.

Referring to FIG. 22, the network may acquire information on the current location and movement direction of the VRU leaving the cluster through a message transmitted by the VRU leaving the cluster, or the like. Thereafter, the network may control a signal of a signal controller adjacent to the current location of the VRU leaving the cluster based on the information on the VRU leaving the cluster. Here, as an example, the network may instruct the traffic control center to control the signals of signal controller 1 and signal controller 2.

Hereinafter, the V2X message related to the cluster will be described.

Figure 23:
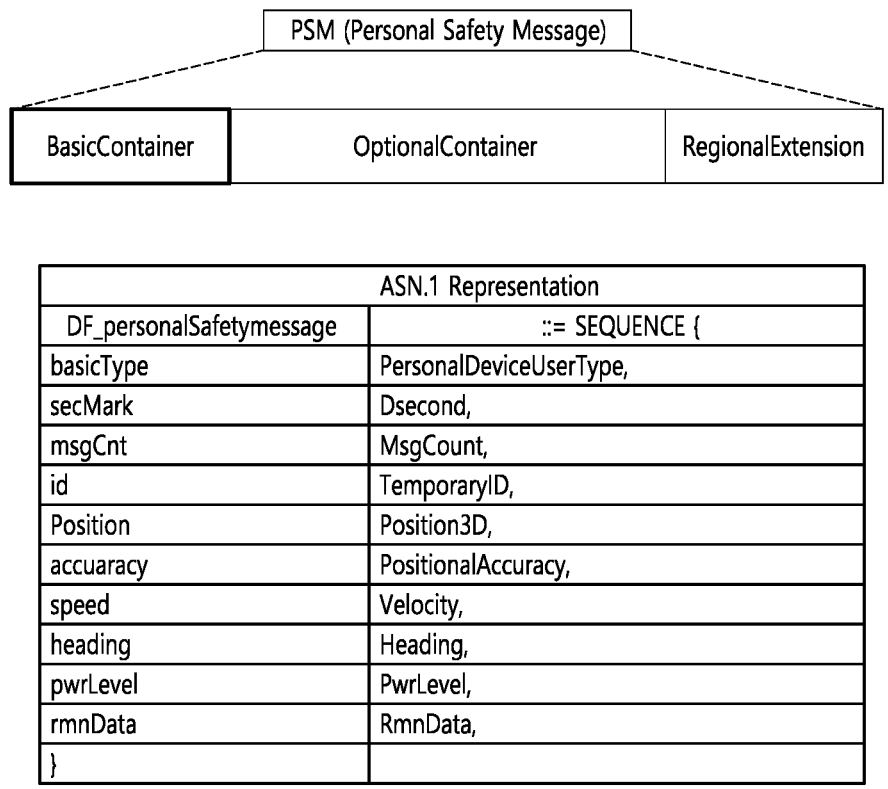
FIG. 23 schematically illustrates an example of a configuration of a PSM message according to some implementations of the present disclosure.

FIG. 23 schematically illustrates an example of a configuration of a PSM message according to some implementations of the present disclosure. Specifically, the PSM message of FIG. 23 may include information related to a pedestrian terminal or VRU clustering.

FIG. 23 shows a configuration of a PSM message and fields of a basic container. Here, the PSM message may include information on a power level or available data amount for a VRU transmitting the PSM message.

For example, the power level may be expressed as a percentage of the amount of remaining power, and in this case, the power level related field may consist of 7 bits.

Also, here, the amount of available data may be expressed in megabytes, since data consumption for PSM message transmission is relatively large, information on gigabyte units may be relatively insignificant. Accordingly, when the amount of available data is equal to or greater than a certain amount, the related field may be expressed as a maximum value. For example, if the maximum value is 32 gigabytes, the field for the amount of usable data may consist of 15 bits (for example, from 1 megabyte to 32767 megabytes expressed in units of 1 megabyte). If the field size needs to be reduced, the amount of data can be measured and expressed in larger units (for example, in units of 2 megabytes or 5 megabytes), or the maximum value can be set smaller.

FIG. 24 schematically illustrates another example of a configuration of a PSM message according to some implementations of the present disclosure.

FIG. 24 shows a configuration of a PSM message and fields of an optional container. In particular, among the fields, the clusterLeaving field may be expressed as ON when the VRU transmitting the PSM message determines by itself that the cluster consisting condition is not satisfied, and OFF when not. That is, the field may consist of 1 bit.

FIG. 25 is a flowchart of an example of a method for detecting an out-of-cluster VRU according to some implementations of the present disclosure. Here, each step or operation shown in FIG. 25 may be performed alone or simultaneously.

FIG. 25 shows a situation in which VRU1, VRU2, and VRU3 form a cluster, and it is assumed that the representative VRU of the cluster is VRU1. Referring to FIG. 25, VRU2 may transmit a PSM message to VRU1 to inform cluster departure, or VRU1 may estimate a distance to VRU2 based on the PSM message. Through this, VRU1 may detect that VRU2 has left the cluster, and may notify the base station of VRU2's departure from the cluster.

The base station may request signal control to the signal controller after confirming that the VRU2 is out of the cluster. The signal controller may control the signaler based on the request.

In addition, after confirming the departure of the VRU2 from the cluster, the base station may notify the surrounding vehicles (VUE1 and VUE2) of the existence of the VRU leaving the cluster through a warning message or the like.

Alternatively, a VRU (VRU3) other than the representative VRU may detect the departure of the VRU2 from the cluster and inform the base station of the departure of the VRU2 from the cluster directly through a PSM message or the like. Even in this case, the base station can notify the surrounding vehicles (VUE1 and VUE2) of the existence of a VRU that has left the cluster through a warning message or the like after confirming the departure of the VRU2 from the cluster.

On the other hand, when a nearby vehicle that has received the warning message discovers VRU2 through a sensor, a camera, or the like, it may notify the base station of this. Specifically, the VRU2 may transmit a captured image or transmit information related to the VRU2.

Figure 26:
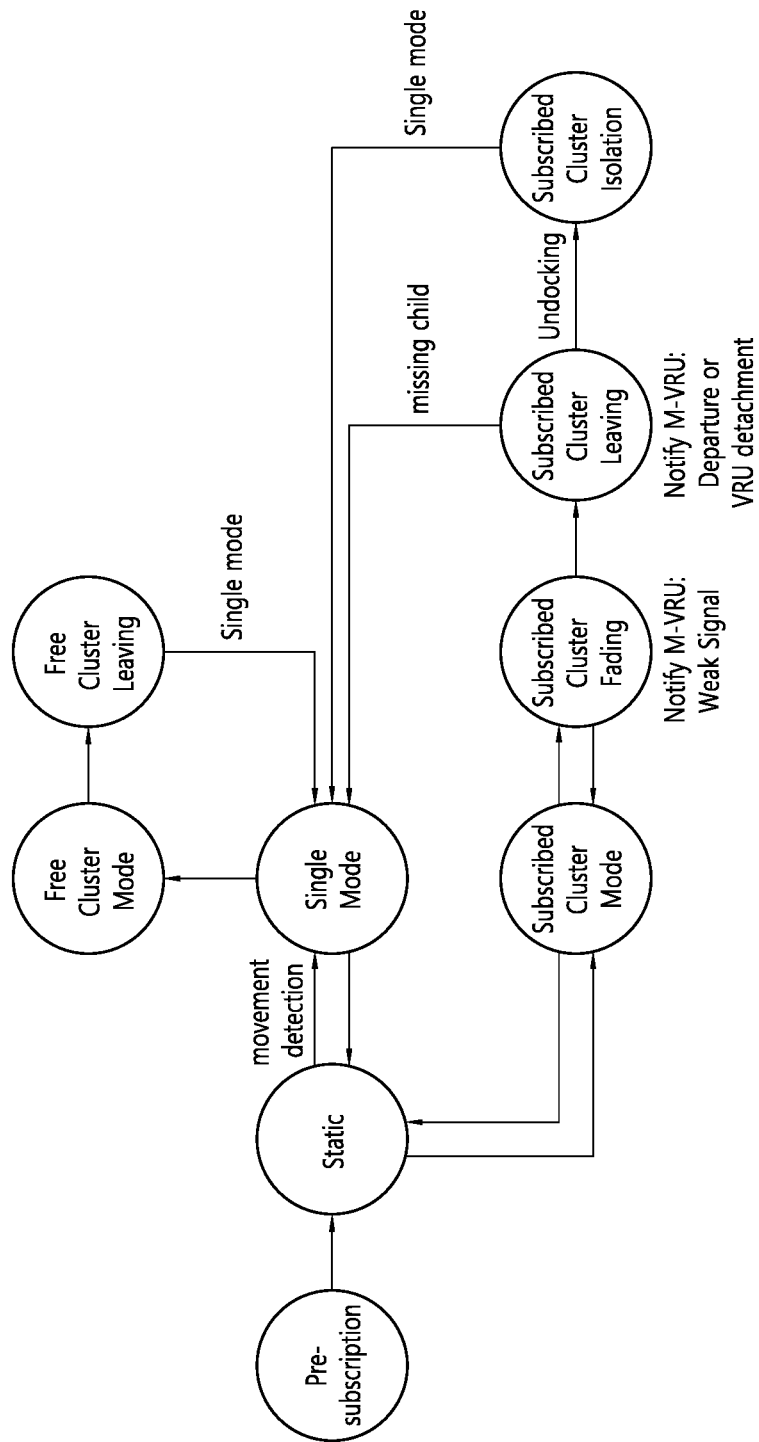
FIG. 26 is a flowchart of an example of a clustering state change in accordance with some implementations of the present disclosure.

FIG. 26 is a flowchart of an example of a clustering state change in accordance with some implementations of the present disclosure. Specifically, FIG. 26 shows a state change of clustering between arbitrary VRUs (free clustering) and/or clustering between known VRUs (subscribed clustering).

For example, if a specific VRU does not subscribe to any cluster without pre-subscription, since it only switches to the free clustering mode and leaves the cluster, other VRUs (e.g., guardian of a specific VRU, etc.) do not perform an operation to include the specific VRU back into the cluster even if mobility occurs in the static state of the specific VRU, the specific VRU operates in a single mode when mobility occurs.

Meanwhile, when a specific VRU subscribes to a specific cluster, the specific VRU may enter a subscribed clustering mode when mobility occurs in a static state.

In addition, when a cluster departure situation starts in the subscription clustering mode (i.e., when there is a risk of cluster departure), the specific VRU may be switched to a subscribed cluster fading mode. In this case, the representative VRU of the specific cluster or another VRU may transmit a warning message or the like to the specific VRU to inform that the specific VRU is likely to leave the specific cluster. Thereafter, when the specific VRU is re-entered or reconfigured in the specific cluster, the specific VRU may be re-changed to the subscription cluster mode. Or, if the subscription cluster fading mode has elapsed for the same or more than a certain period of time, the specific VRU may be determined to have left the specific cluster. In this case, when the representative VRU within a specific cluster recognizes the departure of the specific VRU and terminates the situation, the specific VRU may switch to the single mode. In addition, the specific VRU leaving the specific cluster may be configured in a cluster other than the specific cluster to operate in a subscription clustering mode again, or may be configured in a free cluster and operate in a free cluster mode.

For a specific example related to FIG. 26, there may be a subscription cluster (which can be matched to the specific cluster) consisting of a person to be protected, such as a small child, and a parent of a small child, it matches the young child to the specific VRU, it can match another subscription cluster to a cluster associated with the child's class, a free cluster may be matched to a cluster consisting of the young child and the young child's friends with similar movement paths.

Figure 27:
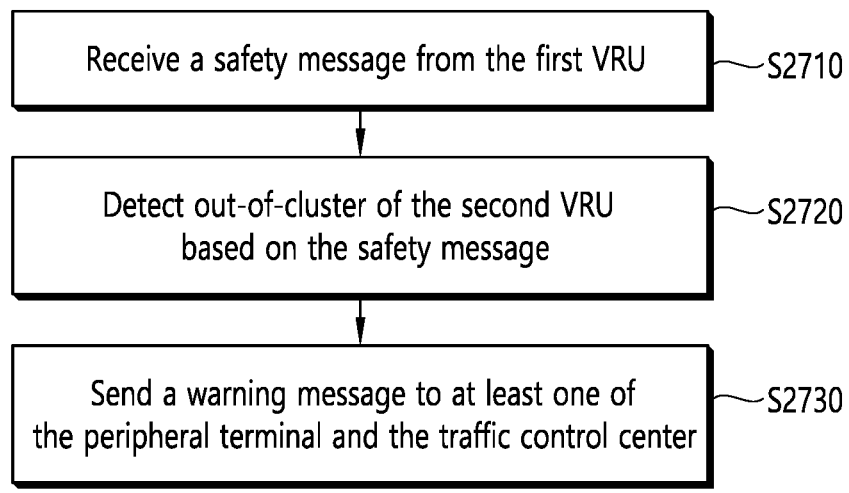
FIG. 27 is a flowchart of an example of a method for detecting out-of-cluster of a VRU according to some implementations of the present disclosure.

FIG. 27 is a flowchart of an example of a method for detecting out-of-cluster of a VRU according to some implementations of the present disclosure.

Referring to FIG. 27, the base station receives a safety message from the first VRU (S2710). Here, the first VRU may be a representative VRU of the cluster or a VRU whose safety message transmission period has arrived.

Thereafter, the base station detects cluster departure of the second VRU based on the safety message (S2720). Here, the first VRU and the second VRU may be included in the same cluster.

Thereafter, the base station transmits a warning message to at least one of a neighboring terminal and a traffic control center (S2730). Here, the warning message may include information related to the second VRU. Also, here, the warning message may include signal control request information.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

The methods proposed in this specification can also be performed by, in addition to the terminal, at least one computer readable medium including instructions based on being executed by at least one processor (computer readable medium), the apparatus configured to control the terminal including one or more processors and one or more processors operably coupled by the one or more processors, and one or more memories for storing instructions, where the one or more processors execute the instructions to perform the methods proposed herein. Also, it is obvious that, according to the methods proposed in this specification, an operation by the base station corresponding to the operation performed by the terminal may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 28:
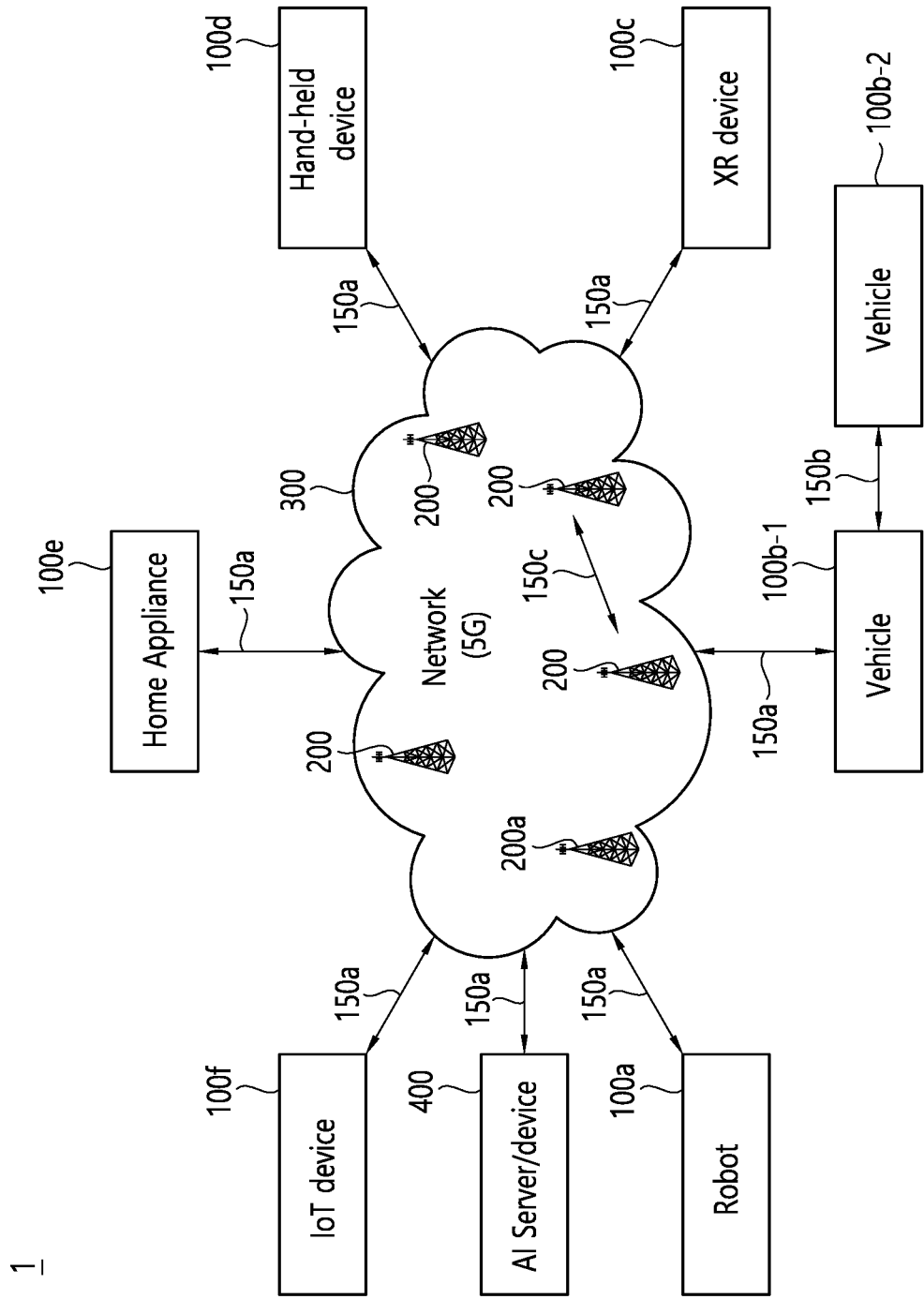
FIG. 28 shows a communication system (1), in accordance with an embodiment of the present disclosure.

FIG. 28 shows a communication system (1), in accordance with an embodiment of the present disclosure.

Referring to FIG. 28, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a-100f) may be connected to the network (300) via the BSs (200). An AI technology may be applied to the wireless devices (100a-100f) and the wireless devices (100a-100f) may be connected to the AI server (400) via the network (300). The network (300) may be configured using a 3G network, a 4G (e.g., LTE) network, or a 5G (e.g., NR) network. Although the wireless devices (100a-100f) may communicate with each other through the BSs (200)/network (300), the wireless devices (100a-100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a-100f).

Wireless communication/connections (150a, 150b, 150c) may be established between the wireless devices (100a-100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 29:
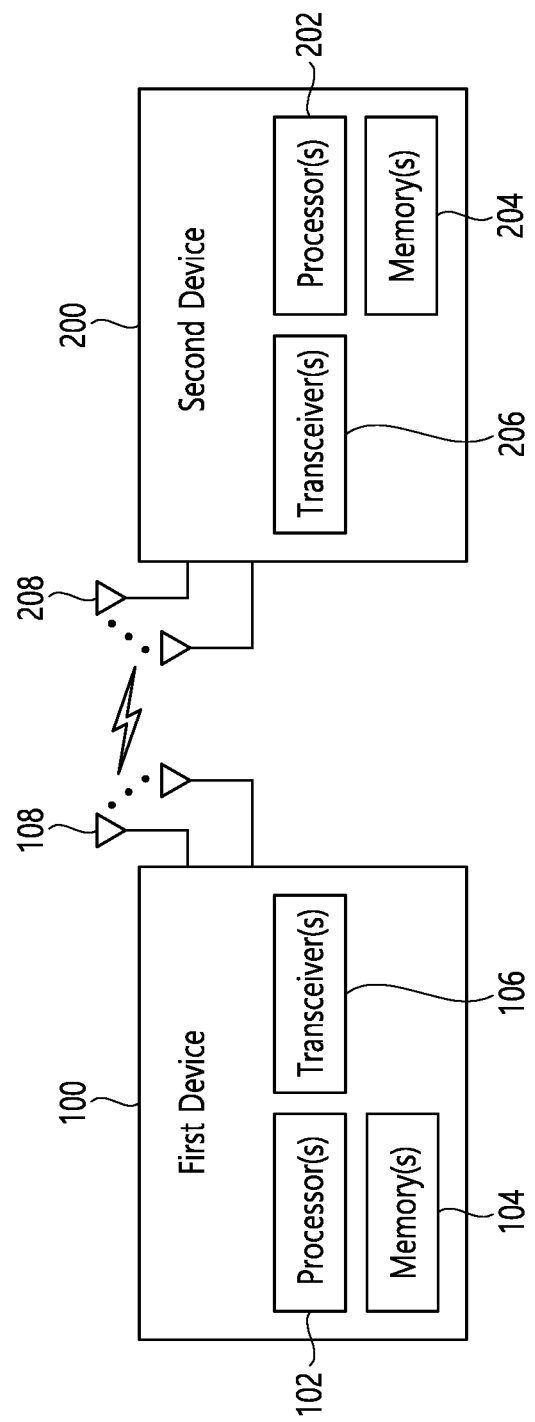
FIG. 29 shows wireless devices, in accordance with an embodiment of the present disclosure.

FIG. 29 shows wireless devices, in accordance with an embodiment of the present disclosure.

Referring to FIG. 29, a first wireless device (100) and a second wireless device (200) may transmit radio signals through a variety of RATs (e.g., LTE and NR). Herein, {the first wireless device (100) and the second wireless device (200)} may correspond to {the wireless device (100x), the BS (200)} and/or {the wireless device (100x), the wireless device (100x)} of FIG. 28.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 30:
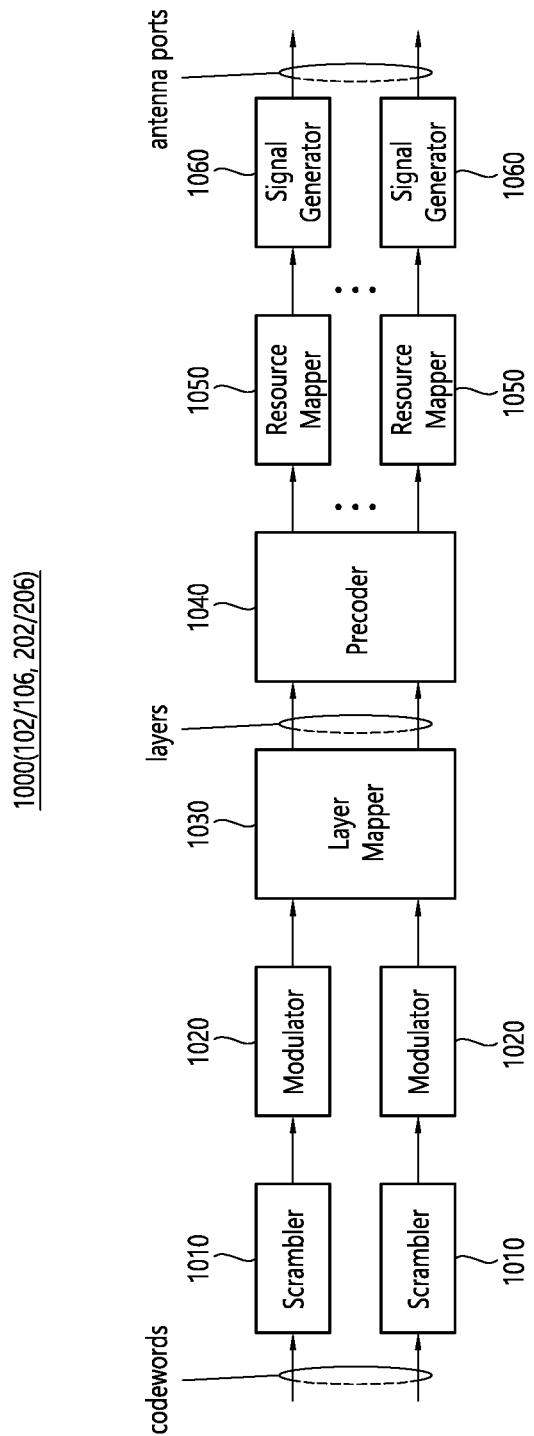
FIG. 30 shows a signal process circuit for a transmission signal, in accordance with an embodiment of the present disclosure.

FIG. 30 shows a signal process circuit for a transmission signal, in accordance with an embodiment of the present disclosure.

Referring to FIG. 30, a signal processing circuit (1000) may include scramblers (1010), modulators (1020), a layer mapper (1030), a precoder (1040), resource mappers (1050), and signal generators (1060). An operation/function of FIG. 30 may be performed, without being limited to, the processors (102, 202) and/or the transceivers (106, 206) of FIG. 29. Hardware elements of FIG. 30 may be implemented by the processors (102, 202) and/or the transceivers (106, 206) of FIG. 29. For example, blocks 1010~1060 may be implemented by the processors (102, 202) of FIG. 29. Alternatively, the blocks 1010~1050 may be implemented by the processors (102, 202) of FIG. 29 and the block 1060 may be implemented by the transceivers (106, 206) of FIG. 29.

Codewords may be converted into radio signals via the signal processing circuit (1000) of FIG. 30. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 30. For example, the wireless devices (e.g., 100, 200 of FIG. 29) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 31:
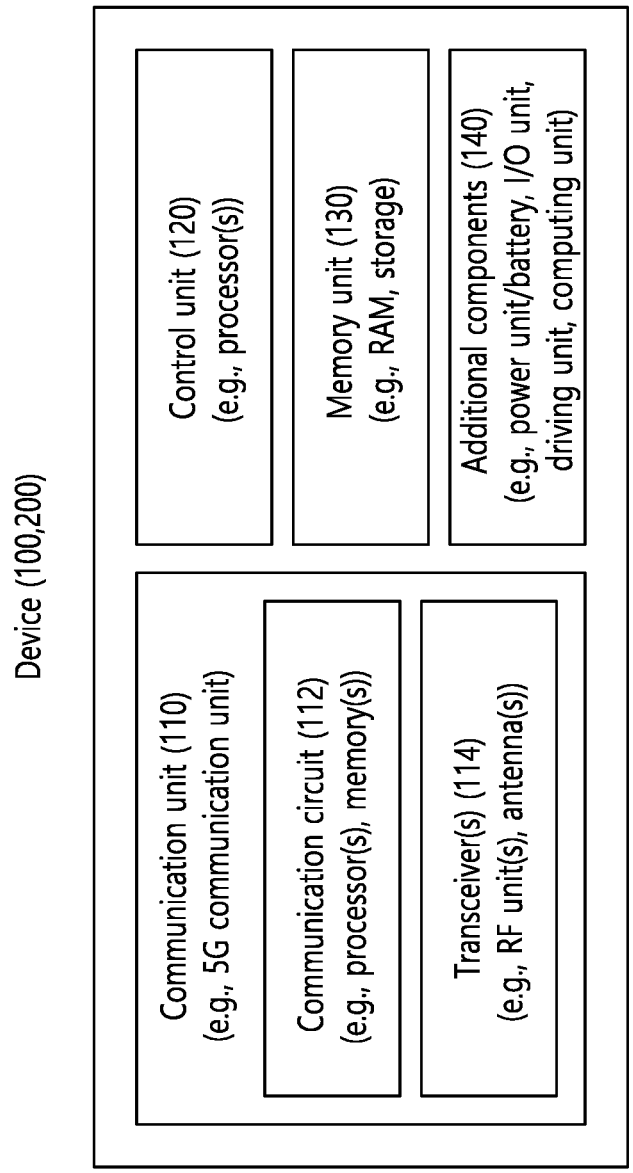
FIG. 31 shows another example of a wireless device, in accordance with an embodiment of the present disclosure.

FIG. 31 shows another example of a wireless device, in accordance with an embodiment of the present disclosure. The wireless device may be implemented in various forms according to a use-case/service (refer to FIG. 28).

Referring to FIG. 31, wireless devices (100, 200) may correspond to the wireless devices (100, 200) of FIG. 29 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 29. For example, the transceiver(s) (114) may include the one or more transceivers (106, 206) and/or the one or more antennas (108, 208) of FIG. 29. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 28), the vehicles (100b-1, 100b-2 of FIG. 28), the XR device (100c of FIG. 28), the hand-held device (100d of FIG. 28), the home appliance (100e of FIG. 28), the IoT device (100f of FIG. 28), a digital broadcast terminal, a hologram device, a public safety device, an MTC device, a medicine device, a fintech device (or a finance device), a security device, a climate/environment device, the AI server/device (400 of FIG. 28), the BSs (200 of FIG. 28), a network node, and so on. The wireless device may be used in a mobile or fixed place according to a use-example/service.

In FIG. 31, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 31 will be described in detail with reference to the drawings.

Figure 32:
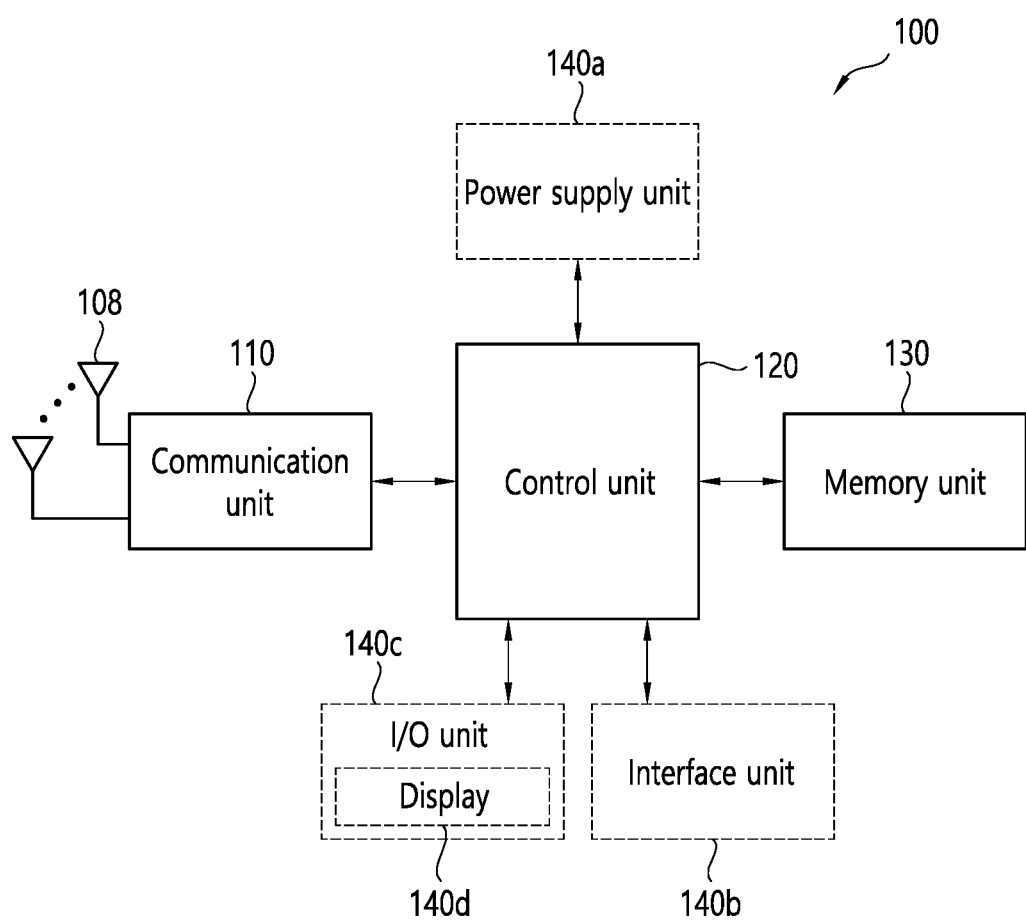
FIG. 32 shows a hand-held device, in accordance with an embodiment of the present disclosure.

FIG. 32 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 32, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110~130/140 of FIG. 31, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 33:
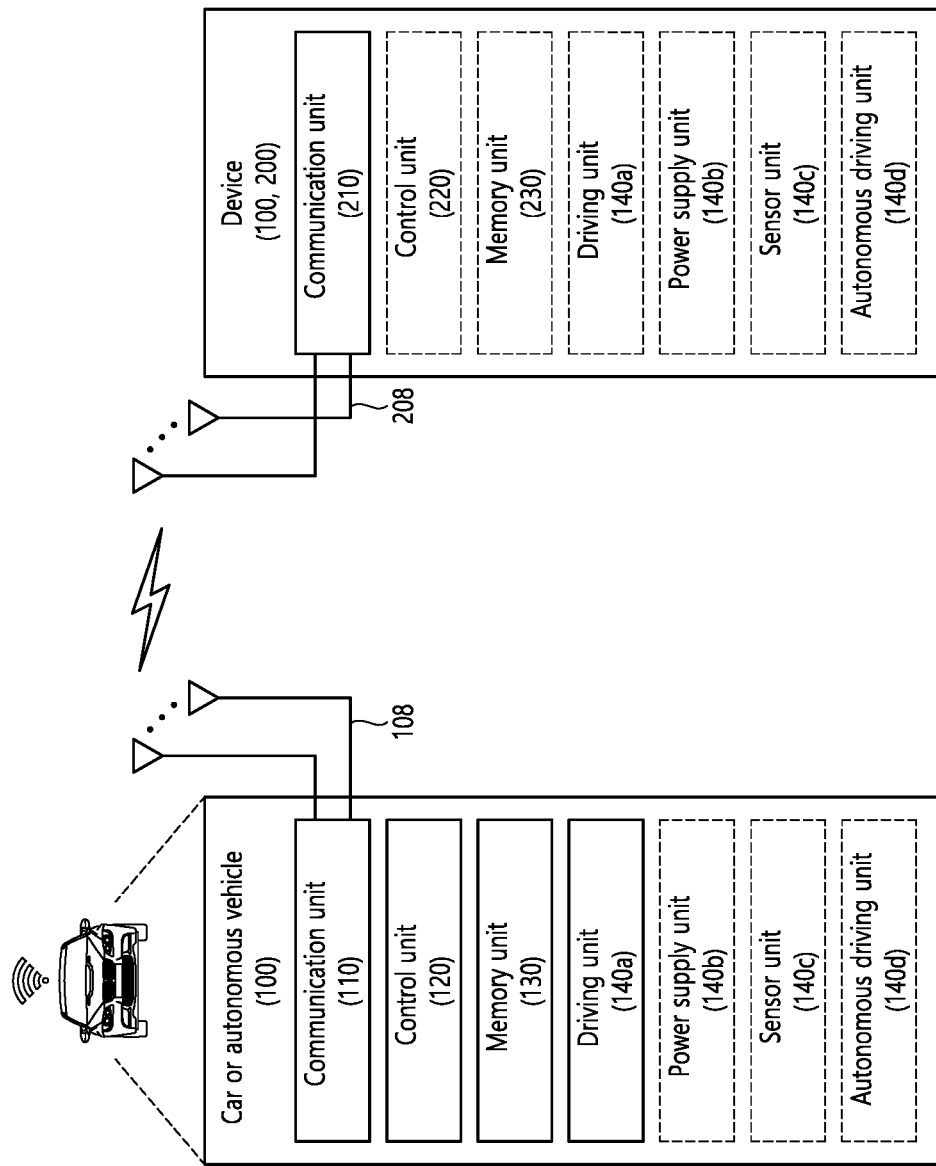
FIG. 33 shows a vehicle or an autonomous vehicle, in accordance with an embodiment of the present disclosure.

FIG. 33 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 33, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 31, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 34:
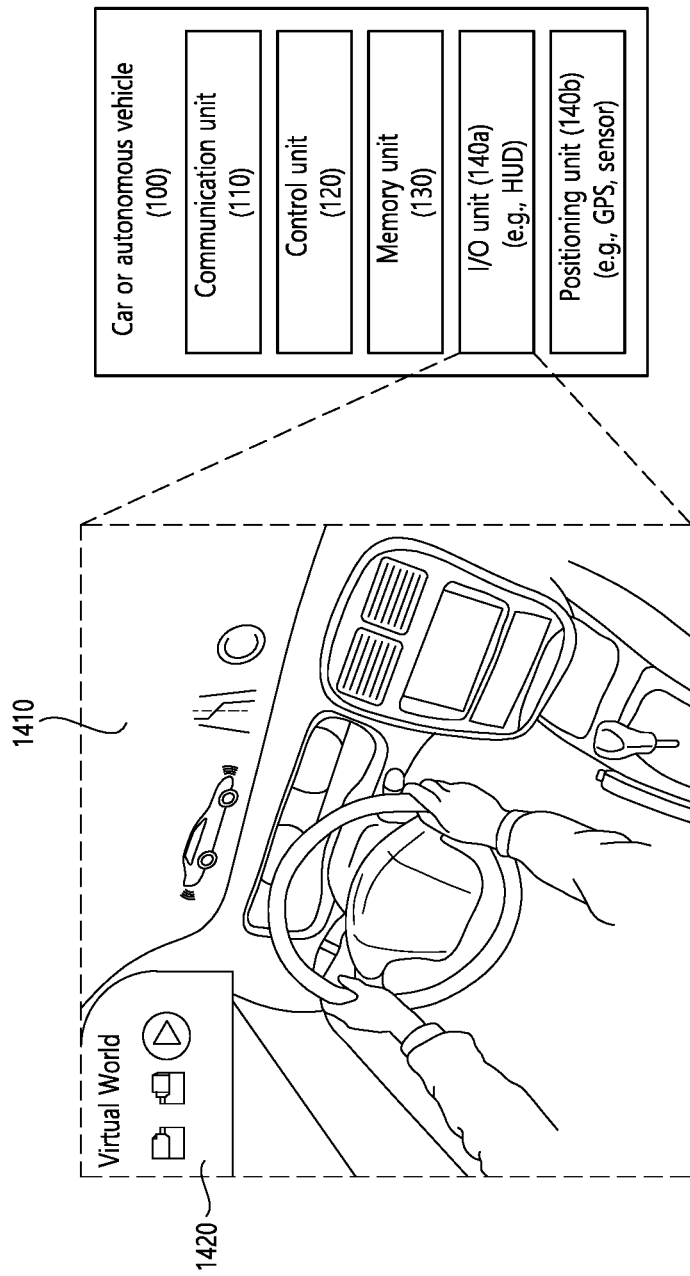
FIG. 34 shows a vehicle, in accordance with an embodiment of the present disclosure.

FIG. 34 shows a vehicle, in accordance with an embodiment of the present disclosure. The vehicle may be implemented as a transport means, an aerial vehicle, a ship, and so on.

Referring to FIG. 34, a vehicle (100) may include a communication unit (110), a control unit (120), a memory unit (130), an I/O unit (140a), and a positioning unit (140b). Herein, the blocks 110-130/140a-140b correspond to blocks 110~130/140 of FIG. 31.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 35:
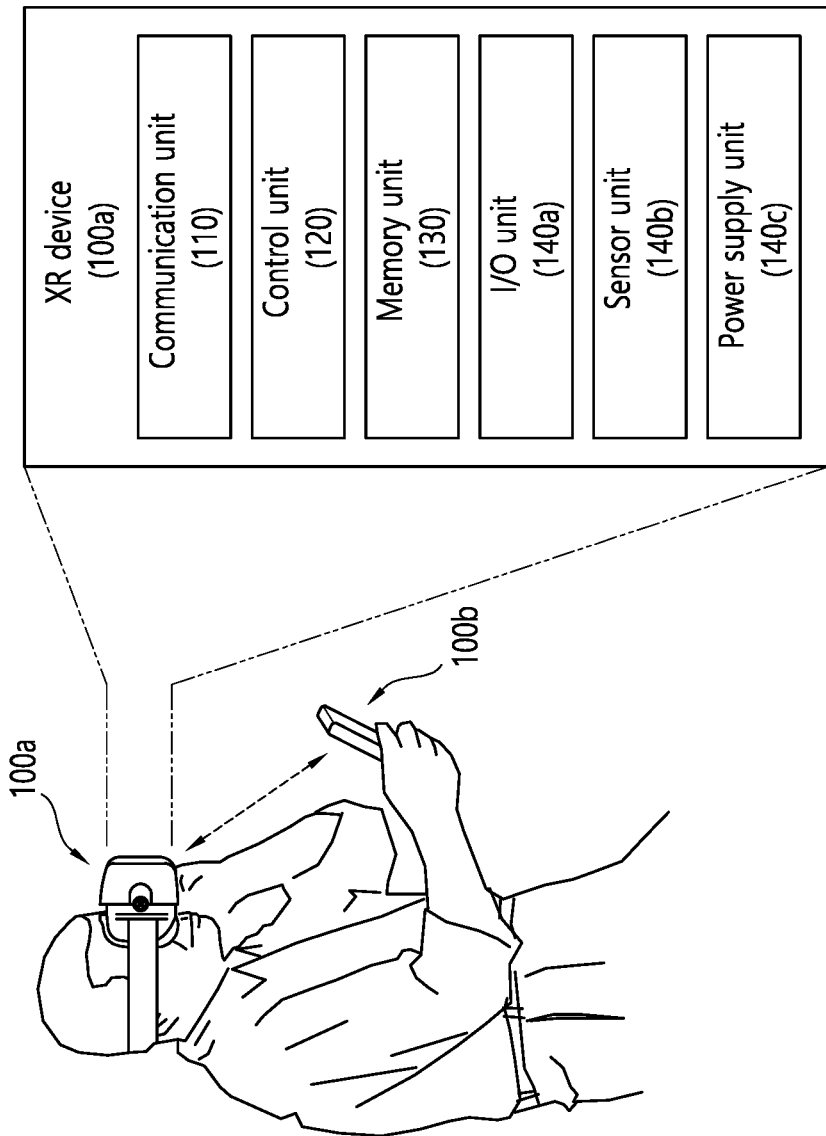
FIG. 35 shows an XR device, in accordance with an embodiment of the present disclosure.

FIG. 35 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 35, an XR device (100a) may include a communication unit (110), a control unit (120), a memory unit (130), an I/O unit (140a), a sensor unit (140b), and a power supply unit (140c). Herein, the blocks 110-130/140a-140c correspond to the blocks 110~130/140 of FIG. 31, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 36:
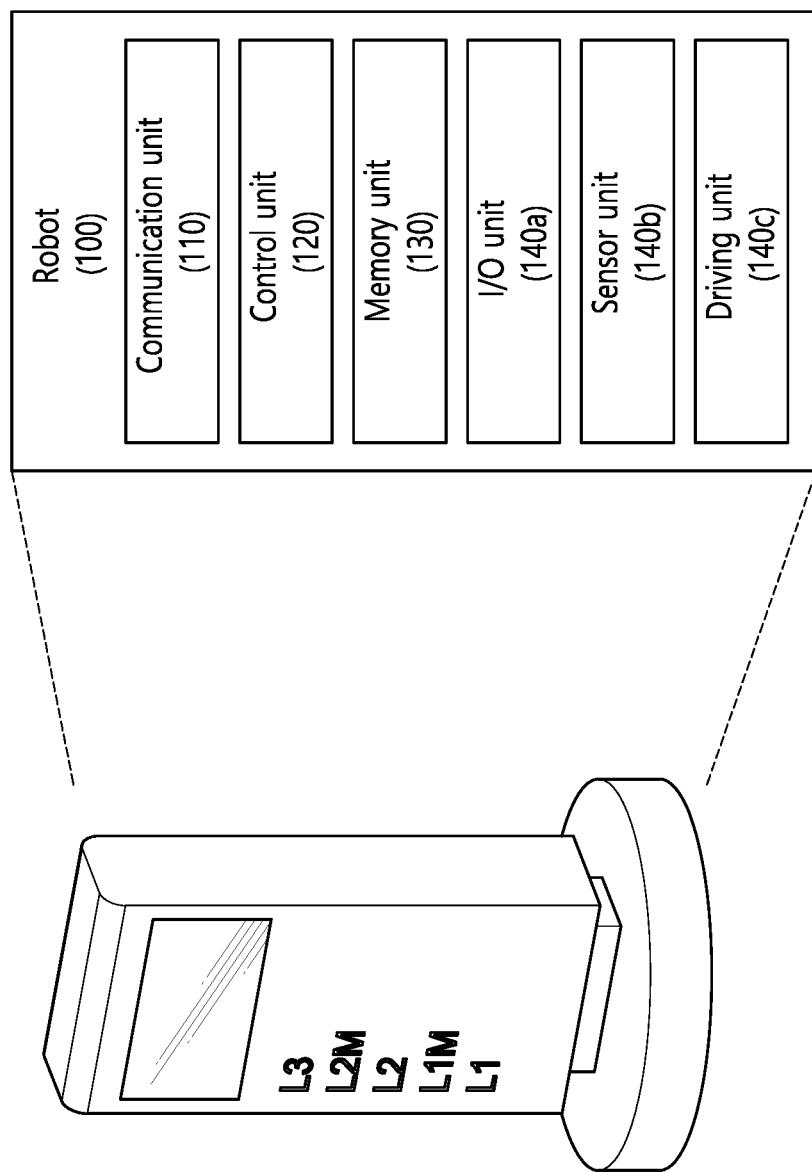
FIG. 36 shows a robot, in accordance with an embodiment of the present disclosure.

FIG. 36 shows a robot, in accordance with an embodiment of the present disclosure. The robot may be categorized into an industrial robot, a medical robot, a household robot, a military robot, and so on, according to a used purpose or field.

Referring to FIG. 36, a robot (100) may include a communication unit (110), a control unit (120), a memory unit (130), an I/O unit (140a), a sensor unit (140b), and a driving unit (140c). Herein, the blocks 110-130/140a-140c correspond to the blocks 110~130/140 of FIG. 31, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 37:
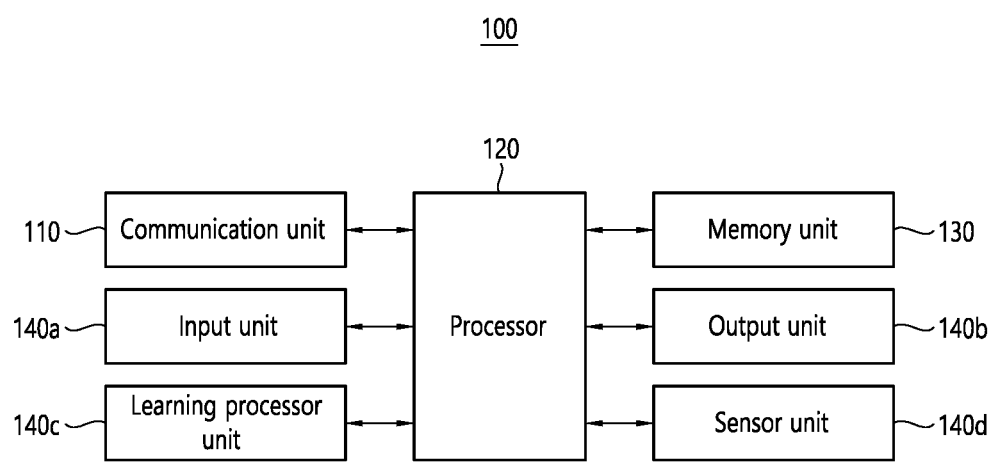
FIG. 37 shows an AI device, in accordance with an embodiment of the present disclosure.

FIG. 37 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 37, an AI device (100) may include a communication unit (110), a control unit (120), a memory unit (130), an I/O unit (140a/140b), a learning processor unit (140c), and a sensor unit (140d). The blocks 110-130/140a-140d correspond to blocks 110~130/140 of FIG. 31, respectively.

The communication unit (110) may transmit and receive wired/radio signals (e.g., sensor information, user input, learning models, or control signals) to and from external devices such as other AI devices (e.g., 100x, 200, 400 of FIG. 28) or an AI server (e.g., 400 of FIG. 28) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 28). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 29). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

What is claimed is:

1. A method for detecting cluster departure, the method performed by a base station and comprising:
    receiving a safety message from a first terminal;
    detecting cluster departure of a second terminal based on the safety message; and
    transmitting a warning message to at least one of a nearby terminal or a traffic control center based on the detection,
    wherein the first terminal and the second terminal are included in a first cluster,
    wherein the safety message includes at least one of cluster information related to mobility of the first cluster or user information related to mobility of the first terminal, and
    wherein the warning message includes departure information related to the second terminal.

2. The method of claim 1, wherein the safety message is transmitted via a Uu interface.

3. The method of claim 1, wherein the base station receives the safety message from each of terminals including the first terminal, and
    wherein the each of the terminals is included in the first cluster.

4. The method of claim 3, wherein the safety message includes user information of the each of the terminals, and
    wherein the user information informs mobility of the each of the terminals.

5. The method of claim 4, wherein the base station measures the mobility of the first cluster based on the mobility of the each of the terminals, and
    wherein the base station detects the cluster departure of the second terminal based on the mobility of the first cluster.

6. The method of claim 3, wherein the safety message is transmitted periodically based on a period, and
    wherein the period is same for the terminals.

7. The method of claim 1, wherein the safety message includes the cluster information related to the mobility of the first cluster and the user information related to the first terminal,
    wherein the base station detects the cluster departure of the second terminal based on the user information and the cluster information.

8. The method of claim 1, wherein the mobility of the first cluster and the mobility of the first terminal comprises at least one of a position, velocity, speed, or direction of movement associated with the first cluster or the first terminal.

9. The method of claim 1, wherein, based on a distance between the second terminal and a central location of the first cluster or a representative terminal of the first cluster being greater than or equal to a distance threshold, the base station detects the cluster departure of the second terminal.

10. The method of claim 1, wherein the warning message requests the traffic control center to control a signal controller.

11. The method of claim 10, wherein the signal controller is located within a specific range based on a location of the second terminal.

12. The method of claim 10, wherein the signal controller is closest to a location of the second terminal.

13. The method of claim 1, wherein the departure information informs mobility of the second terminal.

14. The method of claim 1, wherein the warning message is transmitted through a vehicle-to-everything (V2X) application server.

15. A base station comprising:
at least one memory storing instructions;
at least one transceiver; and
at least one processor coupling the at least one memory and the at least one transceiver, wherein the at least one processor execute the instructions for:
receiving a safety message from a first terminal;
detecting cluster departure of a second terminal based on the safety message; and
transmitting a warning message to at least one of a nearby terminal or a traffic control center based on the detection,
wherein the first terminal and the second terminal are included in a first cluster,
wherein the safety message includes at least one of cluster information related to mobility of the first cluster or user information related to mobility of the first terminal, and
wherein the warning message includes departure information related to the second terminal.

16. The base station of claim 15, wherein the second terminal is associated with a vulnerable road user (VRU).

17. An apparatus comprising:
at least one processor; and
at least one memory operably coupled by the at least one processor and storing instructions, wherein the at least one processor execute the instructions for:
receiving a safety message from a first terminal;
detecting cluster departure of a second terminal based on the safety message; and
transmitting a warning message to at least one of a nearby terminal or a traffic control center based on the detection,
wherein the first terminal and the second terminal are included in a first cluster,
wherein the safety message includes at least one of cluster information related to mobility of the first cluster or user information related to mobility of the first terminal, and
wherein the warning message includes departure information related to the second terminal.

\* \* \* \* \*